(12) United States Patent
Ahn

(10) Patent No.: US 12,307,745 B2
(45) Date of Patent: May 20, 2025

(54) COMPUTING DEVICE FOR INSTANCE-BASED IMAGE QUALITY PROCESSING AND OPERATING METHOD THEREFOR

(71) Applicant: SAMSUNG ELECTRONICS CO., LTD., Suwon-si (KR)

(72) Inventor: Youngchun Ahn, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 526 days.

(21) Appl. No.: 17/682,815

(22) Filed: Feb. 28, 2022

(65) Prior Publication Data

US 2022/0180625 A1 Jun. 9, 2022

Related U.S. Application Data

(63) Continuation of application No. PCT/KR2020/011236, filed on Aug. 24, 2020.

(30) Foreign Application Priority Data

Aug. 30, 2019 (KR) ........................ 10-2019-0107646

(51) Int. Cl.
*G06V 10/77* (2022.01)
*G06N 3/045* (2023.01)
(Continued)

(52) U.S. Cl.
CPC ......... *G06V 10/7715* (2022.01); *G06N 3/045* (2023.01); *G06T 7/0002* (2013.01); *G06V 10/82* (2022.01)

(58) Field of Classification Search
CPC .... G06V 10/7715; G06V 10/82; G06V 10/26; G06V 10/993; G06N 3/045; G06N 3/084;
(Continued)

(56) References Cited

U.S. PATENT DOCUMENTS

2004/0190023 A1 9/2004 Aoyama
2005/0073719 A1 4/2005 Amela et al.
(Continued)

FOREIGN PATENT DOCUMENTS

JP 2004 295236 A 10/2004
JP 2005-129070 A 5/2005

OTHER PUBLICATIONS

Dai, Jifeng, Kaiming He, and Jian Sun. "Instance-aware semantic segmentation via multi-task network cascades." Proceedings of the IEEE conference on computer vision and pattern recognition. 2016. (Year: 2016).*

(Continued)

*Primary Examiner* — Amandeep Saini
*Assistant Examiner* — Denise G Alfonso
(74) *Attorney, Agent, or Firm* — Sughrue Mion, PLLC

(57) ABSTRACT

A computing device for performing image quality processing of an image, and an operating method thereof are provided. The computing device includes: a memory storing at least one instruction; and a processor configured to execute the at least one instruction stored in the memory, to: extract features of an input image by using a first neural network, recognize at least one instance in the input image from the features of the input image by using a second neural network, obtain an image instance quality score map by predicting a quality score corresponding to each instance of the at least one instance in the input image based on the features of the input image by using a third neural network, and perform image quality processing differently for each instance of the at least one instance in the input image by using the quality score corresponding to each instance of the at least one instance in the input image.

13 Claims, 17 Drawing Sheets

(51) Int. Cl.
*G06T 7/00* (2017.01)
*G06V 10/82* (2022.01)

(58) Field of Classification Search
CPC ........ G06N 3/088; G06N 5/04; G06T 7/0002;
G06T 2207/10024; G06T 2207/20081;
G06T 2207/20084; G06T 2207/30168;
G06T 1/20; G06T 1/60; G06T 7/11;
G06T 7/00
See application file for complete search history.

(56) References Cited

U.S. PATENT DOCUMENTS

| 2005/0089246 | A1 | 4/2005 | Luo |
| 2018/0013950 | A1 | 1/2018 | Steinberg et al. |
| 2018/0308267 | A1 | 10/2018 | Ray |
| 2019/0147227 | A1 | 5/2019 | Ko et al. |
| 2020/0337776 | A1* | 10/2020 | Saun ..................... F16M 13/04 |

OTHER PUBLICATIONS

Zhang, Fang-Lue, Miao Wang, and Shi-Min Hu. "Aesthetic image enhancement by dependence-aware object recomposition." IEEE Transactions on Multimedia 15.7 (2013): 1480-1490. (Year: 2013).*
Langendijk, Erno HA, Andreas S. Hotz, and Karel JG Hinnen. "Wide Gamut Color Mapping and Image Enhancement using Image Segmentation." Color and Imaging Conference. vol. 17. Society of Imaging Science and Technology, 2009. (Year: 2009).*
Zhong-Qiu Zhao et al., "Object Detection with Deep Learning: A Review", IEEE Transactions On Neural Networks and Learning Systems, arXiv:1807.05511v2 [cs.CV], Apr. 16, 2019, 22 pages total.
Hossein Talebi et al., "NIMA: Neural Image Assessment", arXiv:1709.05424v2 [cs.CV], Apr. 26, 2018, 15 pages total.
International Search Report and Written Opinion dated Dec. 1, 2020 issued by the International Searching Authority in International Application No. PCT/KR2020/011236 (PCT/ISA/220, PCT/ISA/210, and PCT/ISA/237).
Communication dated Nov. 5, 2024 issued by the Korean Intellectual Property Office in Korean Patent Application No. 10-2019-0107646.

* cited by examiner

FIG. 1
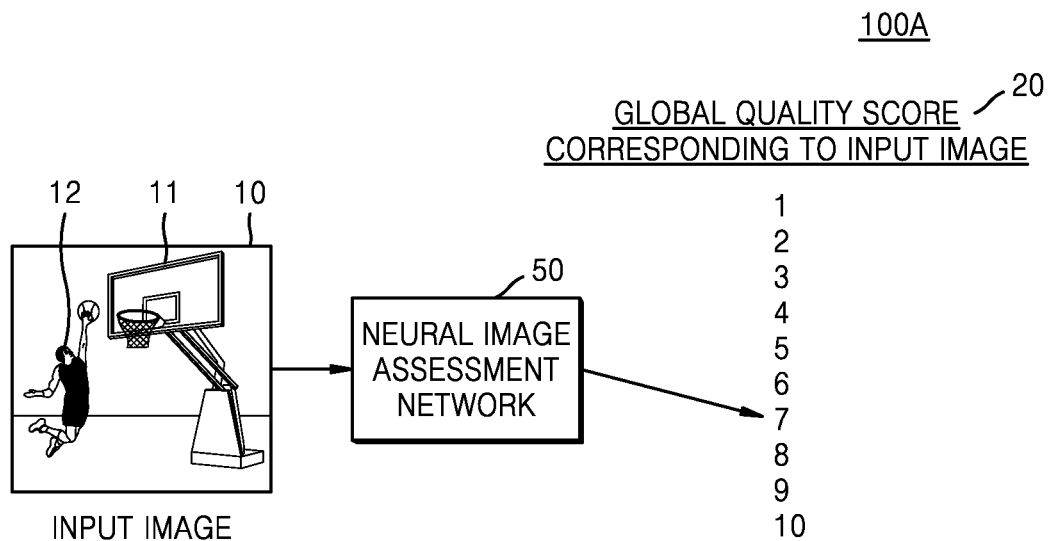
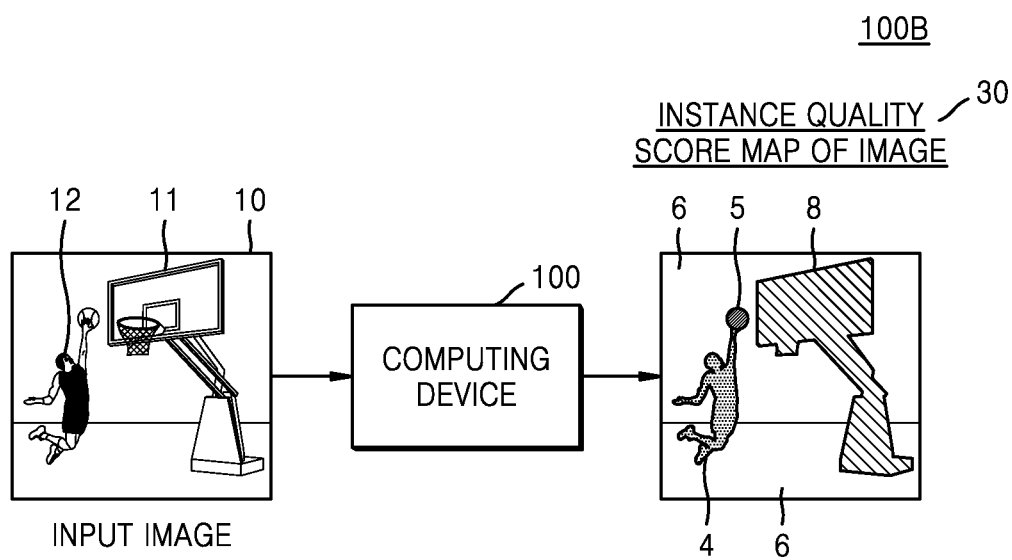

COMPUTING DEVICE FOR INSTANCE-BASED IMAGE QUALITY PROCESSING AND OPERATING METHOD THEREFOR

CROSS-REFERENCE TO RELATED APPLICATIONS

This application is a by-pass continuation application International Application No. PCT/2020/011236, filed on Aug. 24, 2020, which is based on and claims priority to Korean Patent Application No. 10-2019-0107646, filed on Aug. 30, 2019, in the Korean Intellectual Property Office, the disclosures of which are incorporated by reference herein in their entireties.

BACKGROUND

1. Field

The disclosure relates to a computing device and an operating method therefor, and more specifically, to a computing device that performs a function of processing image quality of an input image, and an operating method therefor.

2. Description of Related Art

Quality assessment automatically trained with respect to images has become a hot topic in recent years due to its usefulness in various applications such as image capture assessment, pipelines, storage technologies, and media sharing.

Quantification of image quality has been a long-standing issue in image processing and computer vision. While technical quality assessment involves measuring low-level deterioration such as noise, blurring, or artifacts, aesthetic assessment quantifies semantic level features related to emotion and beauty in images.

In general, image quality assessment may be classified into a full-reference or no-reference approach. The availability of a reference image is assumed in metrics such as peak signal-to-noise ratio (PSNR) or structural similarity index measure (SSIM), but the no-reference approach relies on a statistical model of distortion to predict image quality. The goal of both approaches is to predict a quality score that correlates well with human cognition. However, the subjective features of image quality inevitably remain as basic issues. Recently, deep convolutional neural networks (CNNs) have been used to address these issues. Machine learning has shown remarkable success in predicting the technical quality of images.

High-quality regions and low-quality regions may be mixed even in a single image. For example, in the case of a picture in picture (PIP) image included in a news image, the news image itself may be of high quality, whereas the PIP image may be a low-quality image. In this way, in the case where a high-quality region and a low-quality region are mixed in one image, and the image is predicted with only one of high/medium/low quality values, image quality enhancement is performed with the high/medium/low quality values. However, even in the case where there are several regions of different quality in one image, and image quality enhancement is performed with only one global quality value, there may be an issue that the image quality is not enhanced well, the image quality is only moderately enhanced even though there is room for further enhancement, or the image quality is excessively enhanced to cause side effects.

SUMMARY

Provided are a computing device that enables image quality processing of each instance image according to a quality score of each instance by obtaining a quality score for each of one or more instances included in an input image, and an operating method therefor.

According to an aspect of the disclosure, a computing device includes: a memory storing at least one instruction; and a processor configured to execute the at least one instruction stored in the memory, to: extract features of an input image by using a first neural network, recognize at least one instance in the input image from the features of the input image by using a second neural network, obtain an image instance quality score map by predicting a quality score corresponding to each instance of the at least one instance in the input image based on the features of the input image by using a third neural network, and perform image quality processing differently for each instance of the at least one instance in the input image by using the quality score corresponding to each instance of the at least one instance in the input image.

The image instance quality score map may include position information and a quality score of each instance of the at least one instance in the input image.

The first neural network may include at least one convolutional layer.

The processor may be further configured to execute the at least one instruction to obtain an instance map including a class corresponding to each instance, position information of each instance, and a mask indicating a pixel-unit region of each instance, by recognizing the at least one instance in the input image from the features of the input image by using the second neural network.

The processor may be further configured to execute the at least one instruction to: receive a plurality of training images and a quality score set for each of at least one instance in each training image, infer, from each training image, a quality score corresponding to each of the at least one instance in the training image, and obtain the third neural network by determining a weight of each of at least one layer included in the third neural network to reduce differences between the set quality scores and the inferred quality scores.

The processor may be further configured to execute the at least one instruction to: generate image quality control parameters for each instance in the input image by using the quality score corresponding to each instance in the input image, perform image quality processing for each instance in the input image by using the image quality control parameters corresponding to the instance, and generate an output image by merging the image quality-processed instances.

The image quality control parameters may include an image quality control parameter for at least one of high-frequency component extraction, noise suppression sharpness enhancement, gray scale conversion, and hue correction.

According to an aspect of the disclosure, a method of operating a computing device includes: extracting features of an input image by using a first neural network, recognizing at least one instance in the input image from the features of the input image by using a second neural network, obtaining an image instance quality score map by predicting a quality score corresponding to each instance of the at least one instance in the input image based on the features of the input image by using a third neural network, and performing image quality processing differently for each instance of the at least one instance in the input image by using the quality score corresponding to each instance of the at least one instance in the input image.

The image instance quality score map may include position information and a quality score of each instance of the at least one instance in the input image.

The first neural network may include at least one convolutional layer.

The method may further include obtaining an instance map including a class corresponding to each instance, position information of each instance, and a mask indicating a pixel-unit region of each instance, by recognizing the at least one instance in the input image from the features of the input image by using the second neural network.

The method may further include: receiving a plurality of training images and a quality score set for each instance of at least one instance in each training image, inferring, from each training image, a quality score corresponding to each instance of the at least one instance in the training image, and obtaining the third neural network by determining weights of at least one layer included in the third neural network to reduce differences between the set quality scores and the inferred quality scores.

The method may further include: generating image quality control parameters for each instance in the input image by using the quality score corresponding to each instance of the at least one instance in the input image, performing image quality processing for each instance in the input image by using the image quality control parameters corresponding to the instance, and generating an output image by merging the image quality-processed instances.

The image quality control parameters may include an image quality control parameter for at least one of high-frequency component extraction, noise suppression sharpness enhancement, gray scale conversion, and hue correction.

According to an aspect of the disclosure, a computer-readable recording medium has recorded thereon a program that is executed to perform an operating method of a computing device, the operating method including: extracting features of an input image by using a first neural network, recognizing at least one instance from the features of the input image by using a second neural network, obtaining an image instance quality score map by predicting a quality score corresponding to each instance of the at least one instance in the input image based on the features of the input image by using a third neural network, and performing image quality processing differently for each instance of the at least one instance in the input image by using the quality score corresponding to each instance of the at least one instance in the input image.

According to various embodiments of the present disclosure, by obtaining a quality score for each instance included in an input image, rather than one global quality score for the input image, image quality processing may be independently performed for each instance image according to the quality of each instance image, and thus more effective image quality processing may be performed.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 1 illustrates an example of a system that predicts a quality score of an input image, according to an embodiment, and an example of a computing device that outputs an instance quality score map from an input image, according to an embodiment;

DETAILED DESCRIPTION

Figure 2:
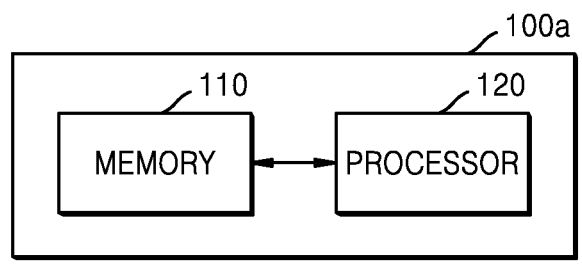
FIG. 2 illustrates an example of a computing device according to an embodiment.

The terms used in the present specification will be briefly described and the present disclosure will be described in detail.

Although the terms used in the present disclosure are selected from among common terms that are currently widely used in consideration of their function in the present disclosure, the terms may be different according to an intention of one of ordinary skill in the art, a precedent, or the advent of new technology. Also, in particular cases, the terms are discretionally selected by the applicant of the present disclosure, in which case, the meaning of those terms will be described in detail in the corresponding part of the detailed description. Therefore, the terms used in the present disclosure are not merely designations of the terms, but the terms are defined based on the meaning of the terms and content throughout the present disclosure.

Throughout the specification, when a part "includes" an element, it is to be understood that the part may additionally include other elements rather than excluding other elements as long as there is no particular opposing recitation. Also, the terms described in the specification, such as " . . . er (or)", " . . . unit", " . . . module", etc., denote a unit that performs at least one function or operation, which may be implemented as hardware or software or a combination thereof.

Hereinafter, embodiments of the present disclosure will now be described in detail with reference to the accompanying drawings for one of skill in the art to be able to perform the present disclosure without any difficulty. The present disclosure may, however, be embodied in many different forms and should not be construed as being limited to the embodiments of the present disclosure set forth herein. Also, parts in the drawings unrelated to the detailed description are omitted to ensure clarity of the present disclosure, and like reference numerals in the drawings denote like elements.

Throughout embodiments of the present disclosure, the term "user" refers to a person who controls a function or an operation of an image display device by using a control device, and may include a viewer, an administrator, or an installation engineer.

FIG. 1 illustrates an example of a system that predicts a quality score of an input image, according to an embodiment, and an example of a computing device that outputs an instance quality score map from an input image, according to an embodiment.

Referring to 100A of FIG. 1, when an input image 10 is input to a conventional neural image assessment network 50, the neural image assessment network 50 may output a global quality score 20 corresponding to the input image 10. In this case, the neural image assessment network 50 may output one global quality score for the entire input image 10, for example, 7 out of quality score levels ranging from 1 to 10.

The input image 10 shows a person 12 playing basketball in front of a basketball goal stand 11 on a playground. For example, in general, in the case of an image that includes an instance with a motion and an instance without any motion as described above, the instance without any motion, for example, the basketball goal stand 11, may have good image quality, but the motion with a motion, for example, the person 12 playing basketball may have relatively poor image quality. However, even in the case where an instance of good quality and an instance of poor quality exist together in one image as described above, the conventional neural image assessment network 50 outputs one global quality score applied to the entire input image 10. For example, a quality score may be represented as one value from 1 to 10. Accordingly, such one global quality score may not be an appropriate value for image quality processing for both the instance without any motion and the instance with a motion of the input image 10. For example, in the case where a quality score is determined separately for each instance in the input image 10, a quality score of the person instance may be 5, and a quality score of the basketball goal stand or the playground may be 9. Nevertheless, because the conventional neural image assessment network 50 outputs one global quality score, 7 may be output. Thus, in the case where image quality processing is performed on the input image 10 based on one quality score globally determined for the input image, it may be difficult to obtain a satisfactory image quality processing result. For example, when considering each instance, as the person instance has a quality score of 5, image quality processing is required to be performed thereon with an intensity higher than that for an instance having a quality score of 7, however, the conventional neural image assessment network 50 outputs only a global quality score of 7, and thus image quality processing is performed based on the quality score of 7.

Accordingly, embodiments of the present disclosure provide a method of predicting a quality score for each of one or more instances included in an input image when predicting a quality score of the input image by using a neural network.

Referring to 100B of FIG. 1, when the input image 10 is input to a computing device 100, the computing device 100 may predict a quality score for each of one or more instances included in the input image 10 by using one or more neural networks, and thus output an instance quality score map 30. For example, the computing device 100 may recognize, from the input image 10, the one or more instances, i.e., the person, a basketball, the basketball goal stand, the playground, and a sky, and predict an instance quality score corresponding to each of the recognized instances. As illustrated in FIG. 1B, the instance quality score map 30 may show a person instance quality score of 4, a basketball instance quality score of 5, a playground instance quality score of 6, a basketball goal stand instance quality score of 8, and a sky instance quality score of 6.

According to the computing device 100 described above, a quality score corresponding to each instance, rather than one global quality score for the input image 10, may be obtained, and thus the computing device 100 may perform image quality processing independently for each instance according to the quality score of the instance. For example, in the instance quality score map 30, the person instance score is 4, which represents a relatively low quality, thus the image quality processing may be performed with a higher intensity, while the basketball goal stand instance score is 8, which represents a relatively high quality, thus the image quality processing may be performed with a lower intensity, and accordingly, the image quality processing on the input image 10 may be performed more effectively.

A neural network is a statistical learning algorithm for implementing machine learning by emulating the brain of an animal. A method, performed by the computing device 100, of predicting the quality score for each instance included in the input image 10 by using one or more neural networks will be described in detail below.

FIG. 2 illustrates an example of a computing device according to an embodiment.

Referring to FIG. 2, a computing device 100a may include a memory 110 and a processor 120. However, the computing device 100a may be implemented by more components than the illustrated components, and is not limited to the above-described example.

The memory 110 according to an embodiment may store a program for processing and control of the processor 120, and may store data input to the computing device 100a or output from the computing device 100a.

The memory 110 may include at least one of flash memory, a hard disk, a multimedia card micro, card-type memory (e.g., SD or XD memory), random access memory (RAM), static random access memory (SRAM), read-only memory (ROM), electrically erasable programmable read-only memory (EEPROM), programmable read-only memory (PROM), magnetic memory, a magnetic disc, or an optical disc.

The processor 120 may control the overall operation of the computing device 100a. For example, the processor 120 may perform the functions of the computing device 100a described in the present disclosure by executing one or more instructions stored in the memory 110.

The processor according to an embodiment 120 may generate an image instance quality score map by predicting a quality score corresponding to an instance for each instance included in the input image by using a learning model using one or more neural networks, and may perform image quality processing with respect to each instance of the input image by using the quality score for each instance of the input image.

According to an embodiment of the present disclosure, the processor 120 may control the above-described operations to be performed, by executing one or more instructions stored in the memory 110. In this case, the memory 110 may store one or more instructions executable by the processor 120.

In addition, according to an embodiment of the present disclosure, the processor 120 may store one or more instructions in an internally provided memory, and may execute the one or more instructions stored in the internally provided memory to perform the above-described operations. That is, the processor 120 may perform a predefined operation by executing at least one instruction or program stored in an internal memory included in the processor 120 or the memory 110.

Although one processor 120 is illustrated in FIG. 2, a plurality of processors may be provided. In this case, each of operations performed by the computing device according to the present embodiment may be performed by at least one of a plurality of processors.

According to an embodiment, the computing device 100a may further include a separate neural network processor. The neural network processor may perform an operation of controlling a predefined operation to be performed, by performing computation through a neural network. In detail, according to an embodiment of the present disclosure, the neural network processor may execute one or more instructions to perform the computation through the neural network.

According to an embodiment, the processor 120 may extract features of the input image by using a first neural network by executing one or more instructions stored in the memory 110, recognize one or more instances from the features of the input image by using a second neural network, obtain an image instance quality score map by predicting a quality score corresponding to each instance recognized in the input image based on the features of the input image by using a third neural network, and perform image quality processing differently for each instance included in the input image by using a quality score corresponding to each instance included in the input image.

According to an embodiment, the image instance quality score map may include a position and a quality score of an instance corresponding to each of one or more instances recognized in the input image.

According to an embodiment, the first neural network may include one or more convolution layers.

According to an embodiment, by executing one or more instructions stored in the memory 110, the processor 120 may obtain an instance map including a class corresponding to each instance, a position of each instance, and a mask indicating a region of each instance in pixels, by recognizing the one or more instances included in the input image from the features of the input image by using the second neural network.

According to an embodiment, by executing one or more instructions stored in the memory 110, the processor 120 may receive a plurality of training images and a quality score set for each of one or more instances included in each training image, infer, from the training image, a quality score corresponding to each of the one or more instances included in the training image, determine weights of one or more layers included in the third neural network to reduce differences between the set quality scores and the inferred quality scores, and thus obtain the third neural network.

According to an embodiment, by executing one or more instructions stored in the memory 110, the processor 120 may generate image quality control parameters for each instance included in the input image by using the quality score corresponding to each instance included in the input image, perform image quality processing for each instance image by using the image quality control parameters corresponding to the corresponding instance, and generate an output image by merging one or more image quality-processed instances.

According to an embodiment, the image quality control parameters may include an image quality control parameter for at least one of high-frequency component extraction, noise suppression sharpness enhancement, gray scale conversion (gamma conversion), and hue correction.

According to the present disclosure, a function of predicting the quality score for each instance in the input image by using artificial intelligence may be operated through the processor 120 and the memory 110. The processor may be composed of one or more processors. In this case, the one or more processors may be general-purpose processors such as a CPU, an AP, or a digital signal processor (DSP), dedicated graphics processors such as a GPU, a vision processing unit (VPU), or dedicated artificial intelligence processors such as an NPU. The one or more processors may perform control to process input data according to predefined operation rules or an artificial intelligence model stored in the memory. Alternatively, in the case where the one or more processors are dedicated artificial intelligence processors, the dedicated artificial intelligence processor may be designed with a hardware structure specialized for processing a specific artificial intelligence model.

The predefined operation rules or artificial intelligence model may be generated via a training process. Being generated via a training process may mean that the predefined operation rules or artificial intelligence model set to perform according to desired characteristics (or purposes) is generated by training a basic artificial intelligence model with a learning algorithm that utilizes a large number of training data. The training process may be performed by a device itself on which artificial intelligence according to the present disclosure is performed or by a separate server and/or system. Examples of the learning algorithm may include, but are not limited to, supervised learning, unsupervised learning, semi-supervised learning, or reinforcement learning.

The artificial intelligence model may be comprised of a plurality of neural network layers. Each of the neural network layers may include a plurality of weight values, and may perform a neural network operation through an operation between an operation result of a previous layer and the plurality of weight values. A plurality of weight values in each of the neural network layers may be optimized by a result of training the artificial intelligence model. For example, the plurality of weight values may be refined to reduce or minimize a loss or cost value obtained by the artificial intelligence model during the training process. An artificial neural network may include a deep neural network (DNN) and may include, for example, a convolutional neural network (CNN), a deep neural network (DNN), a recurrent neural network (RNN), a restricted Boltzmann machine (RBM), a deep belief network (DBN), a bidirectional recurrent deep neural network (BRDNN), or a deep Q-network, but is not limited thereto.

According to an embodiment, the computing device 100a may predict a quality score for each instance of the input image, and perform image quality processing for each instance of the input image according to the predicted quality score for each instance. In addition, the computing device 100a may transmit an image quality-processed image to an externally connected display device by using an output port for outputting a video/audio signal or wireless communication, so as to display the image quality-processed image. The output port may be an HDMI, DP, or Thunderbolt port that transmits video/audio signals simultaneously, or may include ports that output video signals and audio signals separately.

Figure 3:
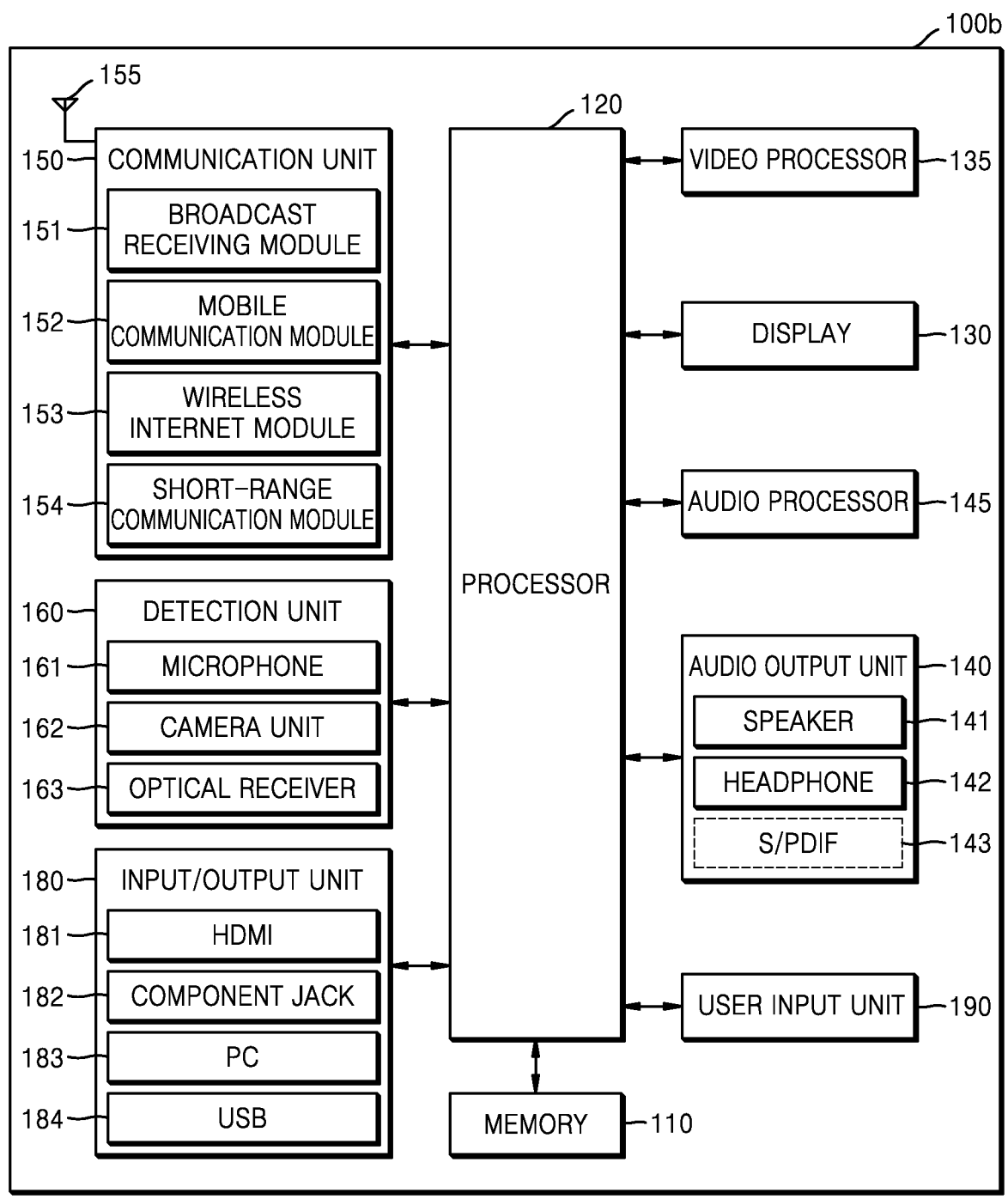
FIG. 3 illustrates an example of a computing device according to an embodiment.

FIG. 3 illustrates an example of a computing device according to an embodiment.

In FIG. 3, the same components as in FIG. 2 are shown by using the same reference numerals. Accordingly, in describing a computing device 100b, descriptions that had been provided in connection with FIG. 2 will be omitted.

Referring to FIG. 3, the computing device 100b may further include a display 130, an antenna 155, a communication unit 150, a detection unit 160, an input/output unit 180, a video processor 135, an audio processor 145, an audio output unit 140, and a user input unit 190, in addition to the memory 110 and the processor 120.

For the memory 110 and the processor 120, the same descriptions as those given with reference to FIG. 2 will be omitted.

The display 130 may display an image on a screen under the control by the processor 120. The image displayed on the screen may be received from the communication unit 150, the input/output unit 180, and the memory 110. According to an embodiment, the display 130 may display an image on which image quality processing is performed for each instance of the input image according to the quality score for each instance of the input image.

The antenna 155 may receive signals transmitted by other devices or transmit signals to the other devices. Although one antenna 155 is illustrated, a plurality of antennas may be provided. Accordingly, the computing device 100b according to the present disclosure may support a multiple input multiple output (MIMO) system.

The communication unit 150 may include one or more modules that enable wireless communication between the computing device 100b and a wireless communication system or between the computing device 100b and a network in which another electronic device is located. For example, the communication unit 150 may include a broadcast receiving module 151, a mobile communication module 152, a wireless Internet module 153, and a short-range communication module 154. The communication unit 150 may be referred to as a transceiver.

The broadcast receiving module 151 may receive a broadcast signal and/or broadcast-related information from an external broadcast management server through a broadcast channel. The broadcast signal may include not only a TV broadcast signal, a radio broadcast signal, and a data broadcast signal but also a broadcast signal in which a data broadcast signal is combined with a TV broadcast signal or a radio broadcast signal.

The mobile communication module 152 may transmit and receive a wireless signal to and from at least one of a base station, an external terminal, and a server, on a mobile communication network. The wireless signals may include various types of data according to transmission and reception of voice call signals, video call signals, or text/multimedia messages.

The wireless Internet module 153 refers to a module for wireless Internet access, and may be installed inside or outside the device. Examples of the wireless Internet technology may include wireless LAN (WLAN) (WiFi), wireless broadband (Wibro), worldwide interoperability for microwave access (Wimax), and high-speed downlink packet access (HSDPA). Through the wireless Internet module 153, the device may establish a Wi-Fi Peer to Peer (P2P) connection with another device. A streaming service between devices may be provided through the Wi-Fi P2P connection, and data transmission/reception or a printing service with connection to a printer may be provided.

The short-range communication module 154 refers to a module for short-range communication. Bluetooth, radio frequency identification (RFID), Infrared Data Association (IrDA), ultra wideband (UWB), ZigBee, or the like may be used as the short-range communication technology.

The communication unit 150 according to an embodiment may receive a learning model using one or more neural networks from an external server.

The communication unit 150 according to an embodiment may establish a connection with another external device or may enable transmission and reception of video/audio data by using the wireless Internet module 153 or the short-range communication module 154.

The detection unit 160 may detect a user's voice, a user's image, or a user's interaction, and may include a microphone 161, a camera unit 162, and an optical receiver 163.

The microphone 161 may receive voice uttered by the user. The microphone 161 may convert the received voice into an electrical signal and output the electrical signal to the processor 120.

The camera unit 162 may receive an image (e.g., consecutive frames) corresponding to a motion of the user, including a gesture, in a recognition range of a camera.

The optical receiver 163 may receive an optical signal (including a control signal) from a remote control device. The optical receiver 163 may receive, from the remote control device, an optical signal corresponding to a user input (e.g., touch, push, a touch gesture, voice, or a motion). A control signal may be extracted from the received optical signal under the control by the processor 120.

The input/output unit 180 may receive video (e.g., a moving image), audio (e.g., voice or music), and additional information (e.g., an EPG) from outside the computing device 100b under the control by the processor 120. The input/output unit 180 may include one of a high-definition multimedia interface (HDMI) port 181, a component jack 182, a PC port 183, and a USB port 184. The input/output unit 180 may include a combination of the HDMI port 181, the component jack 182, the PC port 183, and the USB port 184.

The memory 110 according to an embodiment may store a program for processing and control of the processor 120, and may store data input to the computing device 100b or output from the computing device 100b. Also, the memory 110 may store data necessary for the operation of the computing device 100b.

Figure 4:
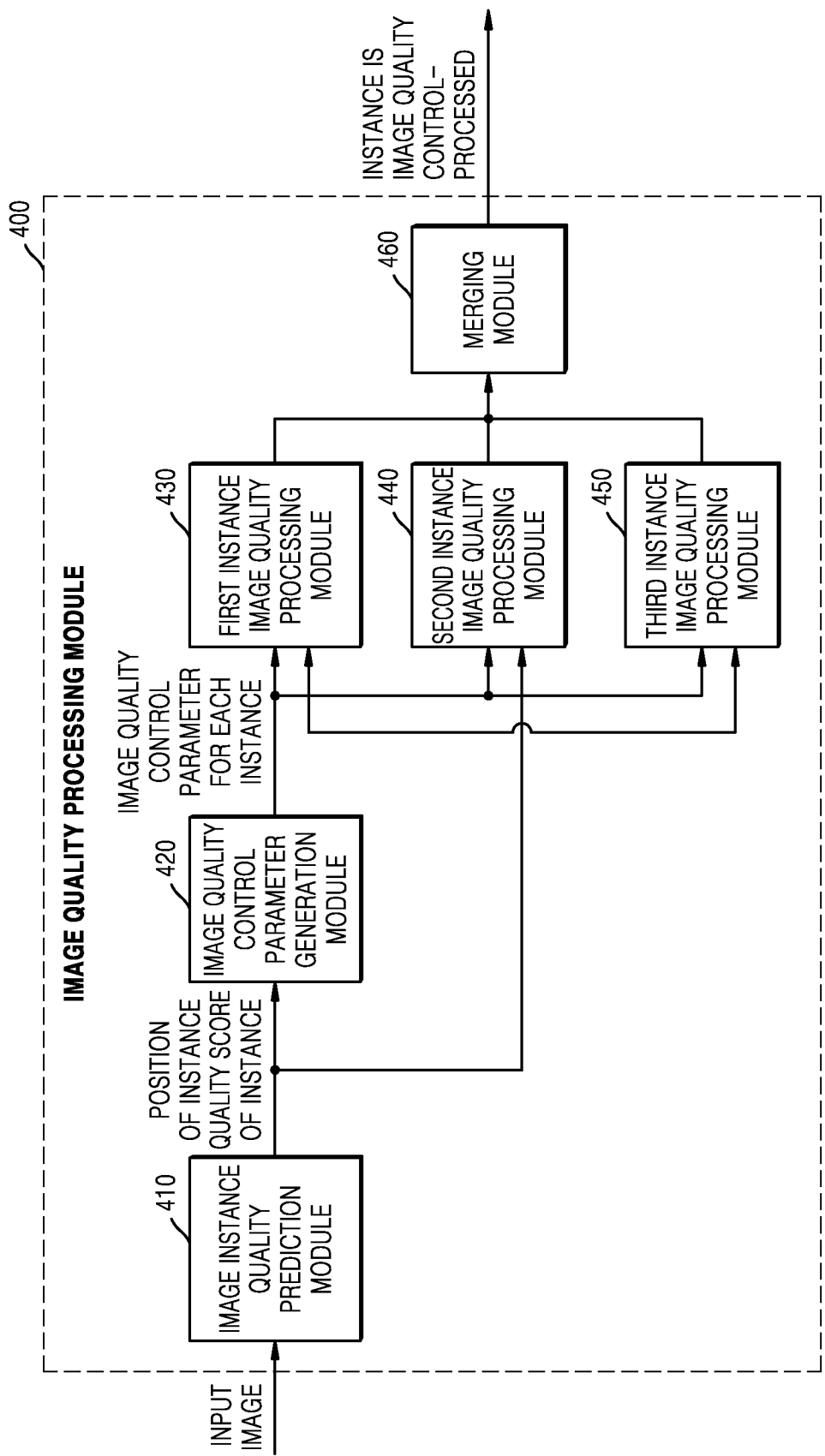
FIG. 4 illustrates an example of a configuration of an image quality processing module 400 that performs an image quality processing operation in a computing device 100, according to an embodiment.

According to an embodiment, the memory 110 may include instructions for implementing an image quality processing module 400 as illustrated in FIG. 4.

In addition, programs stored in the memory 110 may be classified into a plurality of modules according to their functions. Specifically, the memory 110 may store one or more programs for performing a predefined operation by using a neural network.

The processor 120 may perform functions of controlling the overall operation of the computing device 100b and a signal flow between internal components of the computing device 100b, and processing data. In the case where there is a user input or a preset and stored condition is satisfied, the processor 120 may execute an operation system (OS) and various applications stored in the memory 110.

In addition, the processor 120 may include an internal memory. In this case, at least one of data, programs, and instructions stored in the memory 110 may be stored in the internal memory of the processor 120. For example, the internal memory of the processor 120 may store one or more programs for performing predefined operations by using a neural network or one or more instructions for performing predefined operations by using a neural network.

The video processor 135 may process image data to be displayed by the display 130, and may perform various image processing operations such as decoding, rendering, scaling, noise filtering, frame rate conversion, and resolution conversion, with respect to the image data.

According to an embodiment, the video processor 135 may include the image quality processing module 400 as illustrated in FIG. 4.

The audio processor 145 may perform processing on audio data. The audio processor 145 may perform various processing operations such as decoding, amplifying, and noise filtering, with respect to the audio data.

The audio output unit 140 may output audio included in a broadcast signal received through a tuner 155, audio input through the communication unit 150 or the input/output unit 180, and audio stored in the memory 110 under the control by the processor 120. The audio output unit 140 may include at least one of a speaker 141, a headphone output port 142, and a Sony/Philips Digital Interface (S/PDIF) output port 143.

The user input unit 190 is via which the user inputs data for controlling the computing device 100b. For example, the user input unit 190 may include, but is not limited to, a key pad, a dome switch, a touch pad, a jog wheel, a jog switch, or the like.

The block diagrams of the computing devices 100a and 100b illustrated in FIGS. 2 and 3 are examples of embodiments. Each of the components illustrated in the block diagrams may be integrated, added, or omitted according to specifications of the computing devices 100a and 100b actually implemented. For example, two or more components may be combined into one component, or one component may be divided into two or more components, according to necessity. Also, a function performed by each block is for describing embodiments, and its specific operation or device does not limit the scope of the present disclosure.

Hereinafter, a method of performing image quality processing by using the computing device according to the embodiments of the present disclosure will be described.

FIG. 4 illustrates an example of a configuration of the image quality processing module 400 that performs an image quality processing operation in the computing device 100 according to an embodiment.

Referring to FIG. 4, the image quality processing module 400 includes an image instance quality prediction module 410, an image quality control parameter generation module 420, a first instance image quality processing module 430, a second instance image quality processing module 440, a third instance image quality processing module 450, and a merging module 460.

The image instance quality prediction module 410 may include appropriate logics, circuits, interfaces, and/or code operable to predict, for an input image, a quality score for each of one or more instances recognized in the input image by using one or more neural networks.

The image instance quality prediction module 410 may output an image instance quality score map including classes and positions of one or more instances included in the input image and a quality score for each instance.

The class of an instance indicates a type of the instance indicating, for example, whether the instance is a person, a playground, or a basketball.

The position of an instance indicates a position of the instance in the input image.

The image instance quality score map represents a map including the quality score of each of the instances recognized in the input image. Such an image instance quality score map may include class information of the instances and position information of the instances.

The image quality control parameter generation module 420 may include appropriate logics, circuits, interfaces, and/or code operable to receive, from the image instance quality prediction module 410, the classes and the positions of the one or more instances included in the input image, and generate image quality control parameters corresponding to the quality score of each instance. For example, the image quality control parameter generation module 420 may generate the image quality control parameters for high-frequency component extraction, noise suppression sharpness enhancement, gray scale conversion (gamma conversion), and hue correction. The image quality control parameter generation module 420 may generate the image quality control parameters corresponding to each instance by using the quality score of each instance included in the image. The image quality control parameter generation module 420 may output the image quality control parameters generated corresponding to each instance, to each of the instance image quality processing modules 430, 440, and 450.

The first instance image quality processing module 430, the second instance image quality processing module 440, and the third instance image quality processing module 450 may include appropriate logics, circuits, interfaces, and/or code operable to perform image quality processing of a first instance, a second instance, and a third instance, respectively, by using the image quality control parameters generated corresponding to each instance. Although only three instance image quality processing modules are illustrated in FIG. 4, this is merely an example, and as many instance image quality processing modules as the number of instances included in an image may be arranged.

Each of the instance image quality processing modules 430, 440, and 450 may output an image quality-processed instance to the merging module 460.

The merging module 460 may include appropriate logics, circuits, interfaces, and/or code operable to receive and merge the image quality-processed instances from the first instance image quality processing module 430, the second instance image quality processing module 440, and the third instance image quality processing module 450, to generate an output image.

According to an embodiment, the image quality processing module 400 may be included in a part of the video processor 135.

According to an embodiment, the image instance quality prediction module 410 of the image quality processing module 400 may be included in the processor 120 or a part of a dedicated processor separate from the processor 120, and the image quality control parameter generation module 420, the first instance image quality processing module 430, the second instance image quality processing module 440, the third instance image quality processing module 450, and the merging module 460 of the image quality processing module 400 may be included in a part of the video processor 135.

According to an embodiment, the image instance quality prediction module 410 of the image quality processing module 400 may be included in an external server, and an image instance quality score map may be received from the external server through the communication unit 150 of the computing device 100*b*. The received image instance quality score map may be transmitted to the video processor 135, and the image quality control parameter generation module 420, the first instance image quality processing module 430, the second instance image quality processing module 440, the third instance image quality processing module 450, and the merging module 460 may perform image quality processing for each instance of the image by the video processor 135.

Figure 5:
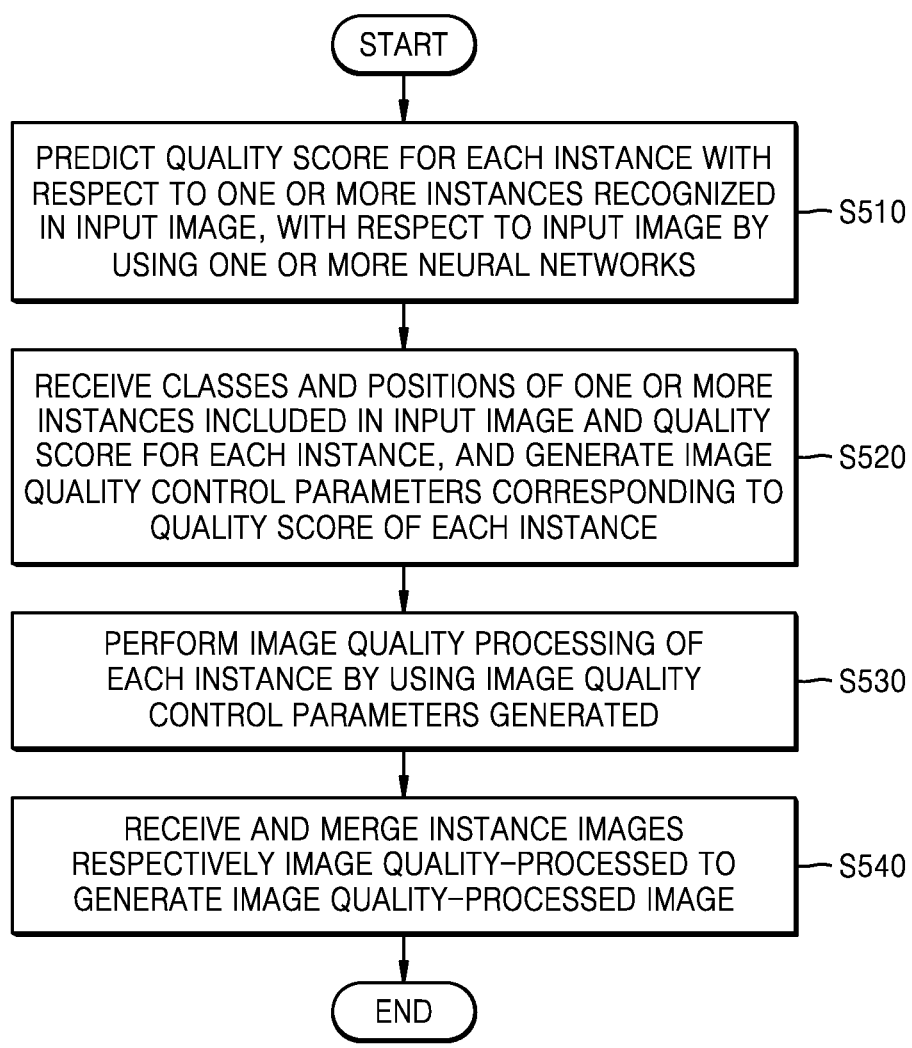
FIG. 5 is a flowchart illustrating an operation of an image quality processing module illustrated in FIG. 4, according to an embodiment.

FIG. 5 is a flowchart illustrating an operation of the image quality processing module illustrated in FIG. 4, according to an embodiment.

Referring to FIG. 5, in operation 510, the image instance quality prediction module 410 predicts a quality score for each instance with respect to one or more instances recognized in an input image, with respect to the input image by using one or more neural networks. Information including the quality score for each instance may be referred to as an image instance quality score map.

Because a quality score is predicted for each instance included in the input image with respect to the input image by using a neural network, image quality processing may be performed by using the predicted quality score for each instance in the case where there are differences between the image qualities of the instances, and thus more effective image quality processing may be performed.

In operation 520, the quality control parameter generation module 420 may receive classes and positions of one or more instances included in the input image and a quality score for each instance, and generate image quality control parameters corresponding to the quality score of each instance.

In operation 530, the instance image quality processing modules 430, 440, and 450 may perform image quality processing of each instance by using the image quality control parameters generated corresponding to each instance.

In operation 540, the merging module 460 may receive and merge instance images respectively image quality-processed by the instance image quality processing modules, to generate an image quality-processed image.

Figure 6:
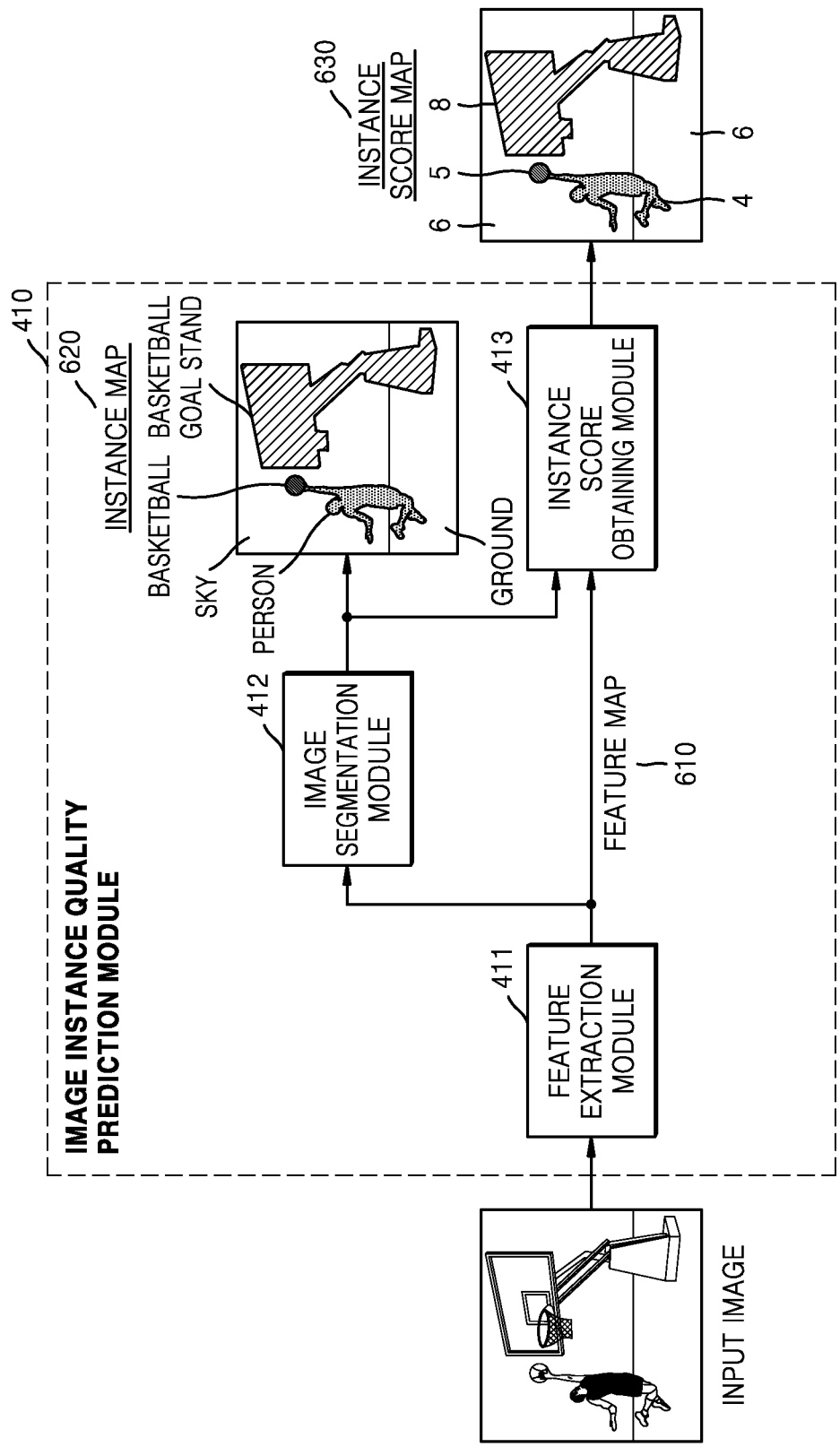
FIG. 6 is a block diagram of a detailed configuration of an image instance quality prediction module illustrated in FIG. 4, according to an embodiment.

FIG. 6 is a block diagram of a detailed configuration of the image instance quality prediction module illustrated in FIG. 4, according to an embodiment.

Referring to FIG. 6, the image instance quality prediction module 410 may include a feature extraction module 411, an instance segmentation module 412, and an instance score obtaining module 413.

The feature extraction module 411 may include logics, circuits, interfaces, and/or code operable to extract features of an input image by using the first neural network.

According to an embodiment, the feature extraction module 411 may extract one or more high-level features from the input image by passing the input image through the first neural network. Such features may be referred to as a feature map. For example, the high-level features extracted from the input image illustrated in FIG. 6 may include a feature map through which a person may be recognized or a feature map through which a basketball goal stand may be recognized.

According to an embodiment, the first neural network may include a classical convolutional neural network such as VGG, MobileNet, or ResNet.

The instance segmentation module 412 may include logics, circuits, interfaces, and/or code operable to recognize one or more instances included in the input image by using the features of the input image and generate an instance map, by using the second neural network.

According to an example, the instance segmentation module 412 may receive the features of the input image and pass the features through the second neural network, so as to obtain an instance map indicating the one or more instances included in the input image. For example, when the input image illustrated in FIG. 6 is passed, the instance map may include an instance in which instances such as the person, the basketball, the basketball goal stand, the playground, and the sky are segmented.

According to an embodiment, the second neural network may include an instance segmentation network such as a mask R-CNN.

The instance score obtaining module 413 may include logics, circuits, interfaces, and/or code operable to predict a quality score corresponding to each of the one or more instances recognized in the input image by using the features and the instance map of the input image by using the third neural network, so as to generate an instance quality score map.

According to an embodiment, the instance score obtaining module 413 may receive the features and the instance map of the input image and pass the features and the instance map through the third neural network, so as to obtain the instance quality score map indicating the quality score of each of the one or more instances included in the input image. For example, the instance quality score map may include a quality score of 4 for the person, a quality score of 5 for the basketball, a quality score of 8 for the basketball goal stand, a quality score of 6 for the playground, and a quality score of 6 for the sky. If the quality score for each instance of the input image is obtained and used for the image quality processing module 400 illustrated in FIG. 4, the image quality processing module 400 may perform image quality processing differently according to the quality score of each instance of the image.

According to an embodiment, the third neural network may include a network consisting of an FC layer and a softmax layer.

Figure 7:
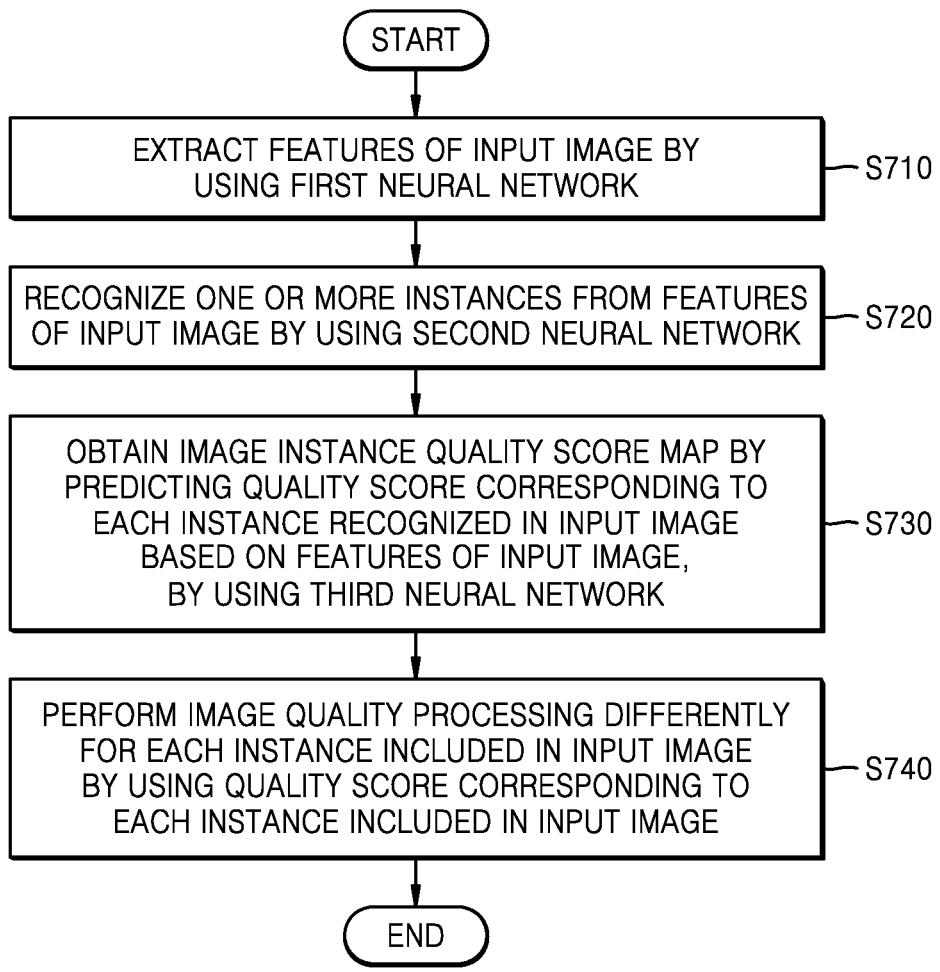
FIG. 7 is a flowchart illustrating an image quality processing method using an image instance quality prediction module illustrated in FIG. 6, according to an embodiment.

FIG. 7 is a flowchart illustrating an image quality processing method using the image instance quality prediction module illustrated in FIG. 6, according to an embodiment.

Referring to FIG. 7, in operation 710, the feature extraction module 411 may extract the features of the input image by using the first neural network.

In operation 720, the instance segmentation module 412 may receive the features of the input image, and recognize one or more instances from the input image by using the second neural network.

In operation 730, the instance score obtaining module 413 may obtain the image instance quality score map by predicting a quality score corresponding to each instance recognized in the input image based on the features of the input image, by using the third neural network.

In operation 740, the image quality processing module may perform image quality processing differently for each instance included in the input image by using the quality score corresponding to each instance included in the input image.

Hereinafter, a neural network used by each component of the image instance quality prediction module 410 illustrated in FIG. 6 will be described.

According to an embodiment, the feature extraction module 411 may extract the features from the input image by using a neural network.

VGG, MobileNet, ResNet, or the like may be used as a feature extraction model.

Figure 8:
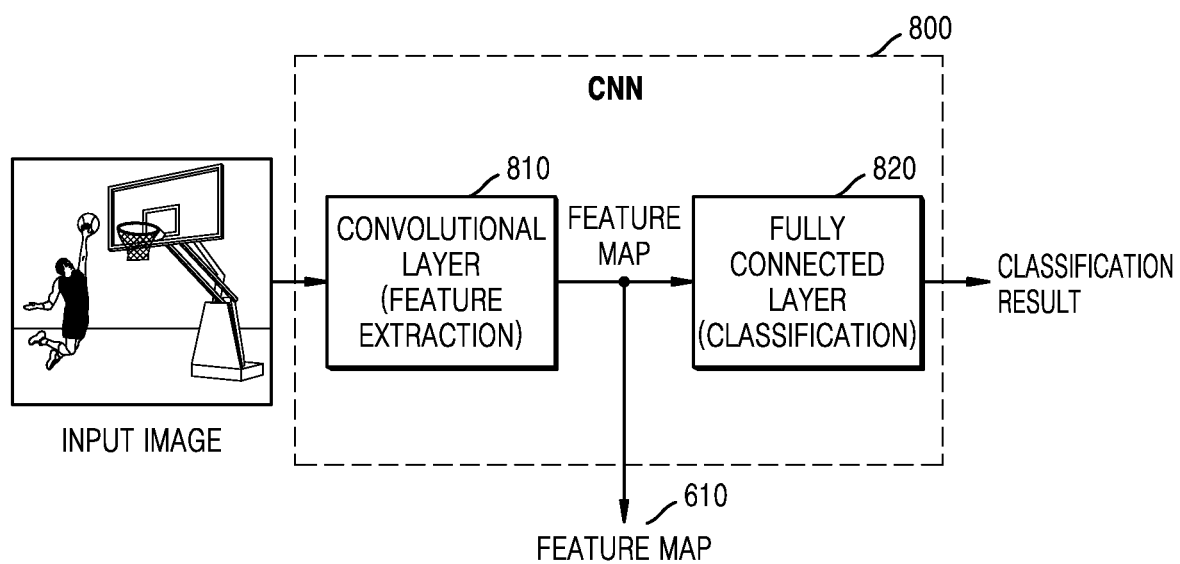
FIG. 8 illustrates a structure of a general convolutional neural network (CNN)

FIG. 8 illustrates a structure of a general CNN.

A CNN 800 is composed of a convolutional feature extraction part 810 and a classification part 820. The features of the input image are extracted through convolutional layers, and classification is performed based on the extracted features by using an existing neural network.

The convolutional layer extracts features from input data, and is composed of filters that extract the features and an activation function that changes a value of the filter to a nonlinear value. The filter may be referred to as a function that detects whether a to-be-extracted feature of an image is included in target data. When a feature map is extracted through the filters, a value is activated by applying the activation function to the feature map. Representative activation functions include a sigmoid function and a ReLu function.

The extracted features are subjected to a sub-sampling process if necessary, which is to reduce the amount of computation by reducing the size of the extracted feature map and is also referred to as pooling.

When features are extracted in the convolutional layer, the fully connected layer 820 classifies the extracted features by applying the extracted features to an existing neural network, and, for example, a softmax Function may be used.

The feature extraction module 411 may extract various features in various scales of an image by using the convolutional layer and various filters.

In general, lower-level features of an image may be extracted in the lower depth of the convolutional layer, and higher-level features of the image may be extracted in the higher depth of the convolutional layer. For example, in the case of a person's face, low-level features may include more partial features such as the person's eyes or nose, and high-level features may include more overall features such as the person's whole face. Accordingly, the feature extraction module 411 may appropriately extract and use a feature map corresponding to the high-level features and a feature map corresponding to the low-level features.

In addition, feature factors to be extracted from an image may be adjusted by using filters used in each convolutional layer. For example, a color feature or a texture feature may be extracted from the image by using a filter used to extract color information from an image or a filter used to extract texture information from an image.

The feature extraction module 411 may use a network such as VGG, MobileNet, ResNet, or feature pyramid network (FPN).

Figure 9:
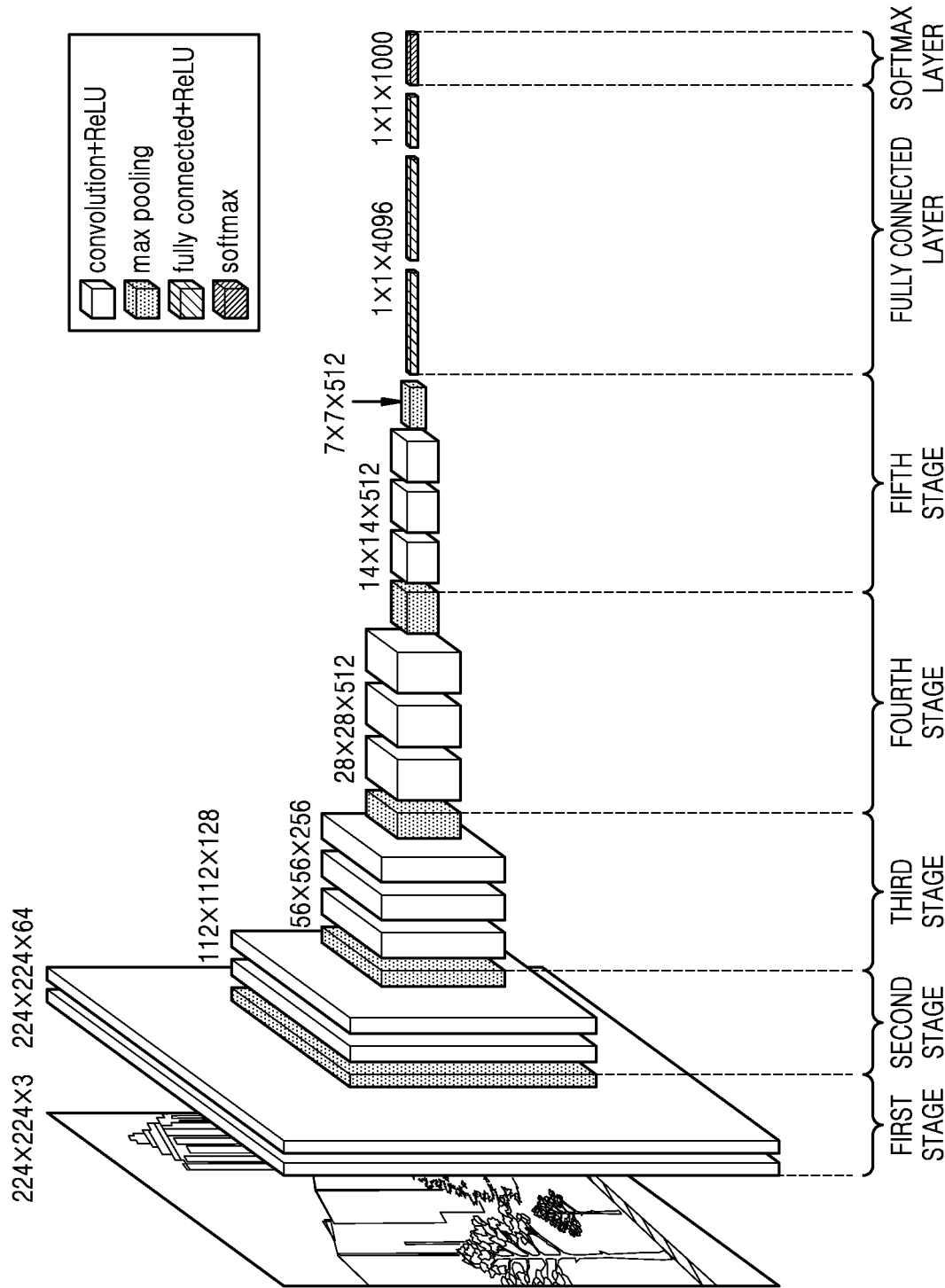
FIG. 9 illustrates a structure of Visual Geometry Group (VGG) according to an example.

FIG. 9 illustrates a structure of VGG according to an example.

Referring to FIG. 9, the VGG receives an RGB input image 910 having a size of 224×224×3.

A first stage consists of two convolutional layers and a max pooling layer, a second stage consists of two convolutional layers and a max pooling layer, a third stage consists of three convolutional layers and a max pooling layer, a fourth stage consists of three convolutional layers and a max pooling layer, and a fifth stage consists of three convolutional layers and a max pooling layer.

The convolutional layer is a layer that extracts features through a convolution operation, and consists of multiplication with a regular pattern. The pooling layer reduces a dimension through sub-sampling that maps multiple pixels to one pixel.

Next, three fully connected layers follow. Then, softmax is performed.

The fully connected layers follow the stack of convolutional layers. Each of the first two has 4096 channels, and the third performs 1000-way ILSVRC classification and contains 1000 channels. The final layer is a softmax layer.

Figure 10:
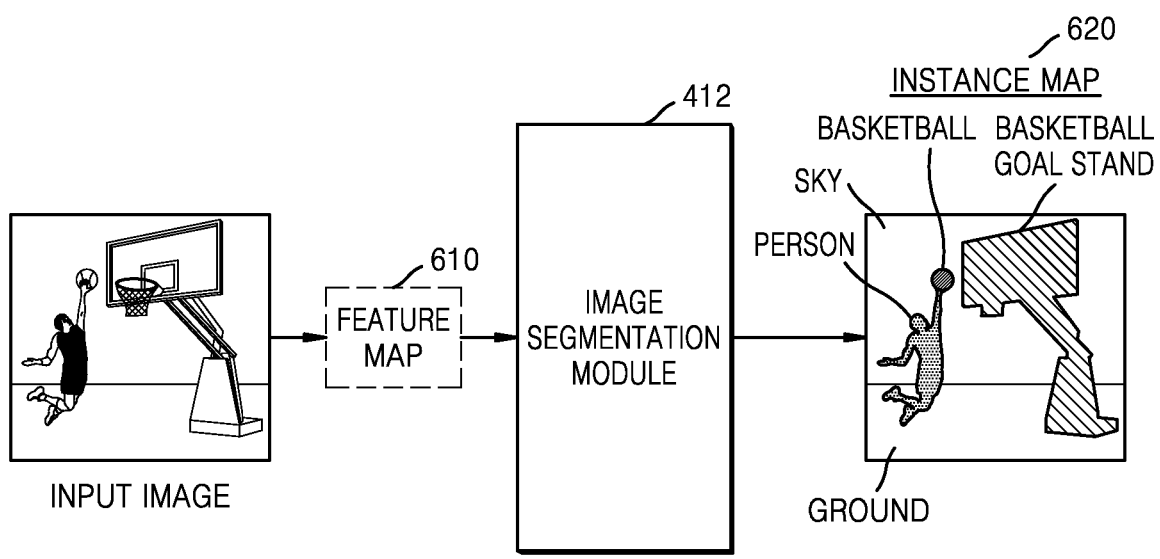
FIG. 10 illustrates an example of an instance segmentation module according to an embodiment.

FIG. 10 illustrates an example of the instance segmentation module according to an embodiment.

Referring to FIG. 10, the instance segmentation module 412 may receive the feature map extracted from the input image, and generate the instance map of the input image by recognizing one or more instances of the input image from the feature map of the input image by using the second neural network. The instance segmentation module 412 may generate the instance map in which a person instance, a playground instance, a basketball instance, a basketball goal stand instance, and a sky instance are identified, from the input image illustrated in FIG. 10.

The second neural network used by the instance segmentation module 412 to recognize one or more instances from the input image may include, for example, a mask R-CNN. However, this network is merely an example, and various networks capable of recognizing and masking an instance from features of an image may be determined.

Figure 11:
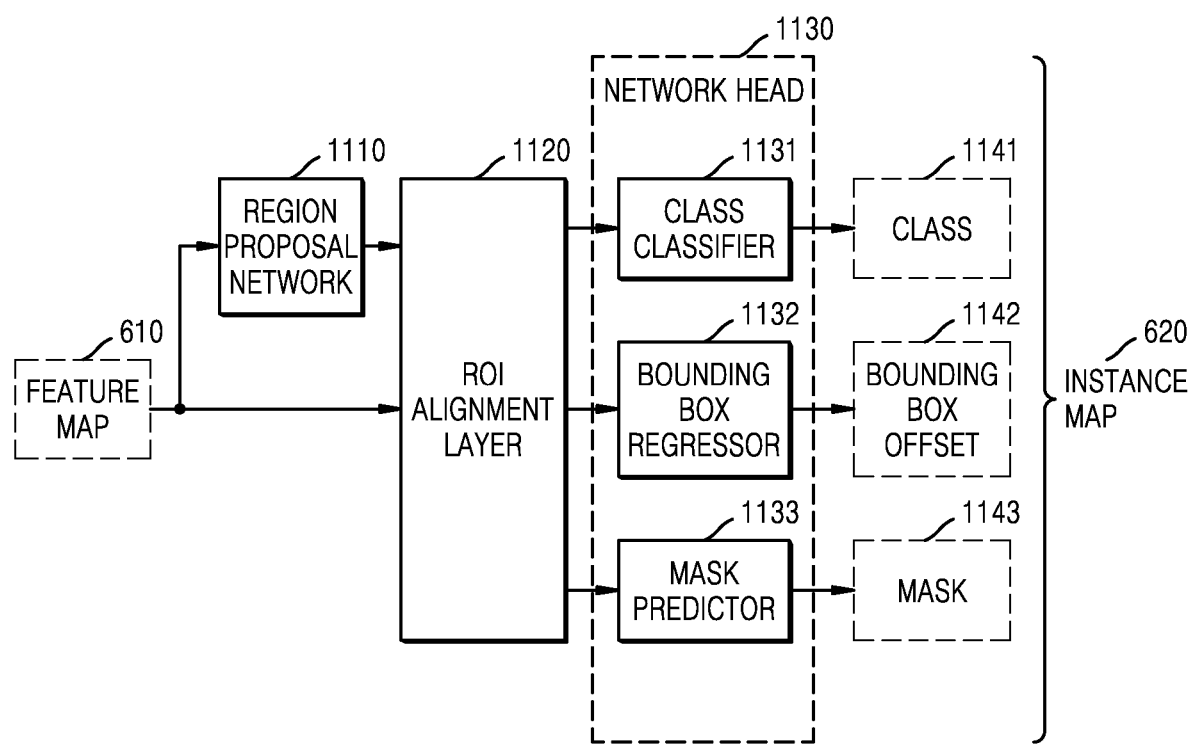
FIG. 11 illustrates an example of a structure of a mask region-based CNN (R-CNN) according to an embodiment.

FIG. 11 illustrates an example of a structure of a mask R-CNN according to an embodiment.

A region proposal network (RPN) 1110 scans a received feature map 610 to propose a region that is likely to contain an object. Although scanning a feature map is an efficient method, a method of binding features to positions of an actual image is required. The solution is an anchor. The anchor is a set of boxes having predefined positions and scales in relation to an input image. Classes (object or background) and bounding boxes are assigned to individual anchors. Because anchors having different scales are bound to feature maps of different levels, the RPN uses these anchors to determine a position of the feature map to locate an object and the size of the bounding box.

An ROI alignment layer 1120 creates a mask for each object at the pixel level for appropriate regions of the feature map to be located. ROI Align samples the feature map at different points and applies bilinear interpolation.

In order to accurately predict a pixel mask, the mask R-CNN needs to align ROI features (small feature map) to accurately preserve spatial correspondence for each pixel. To this end, the mask R-CNN uses the ROI alignment layer, which extracts values of input features at four regularly sampled positions in each ROI bin and performs max pooling or average pooling on the features. Because quantization of features is not used, pixel-unit alignment between an input and an output of a network is performed.

ROI-aligned features are transmitted to a network head 1130. The network head 1130 includes three parallel task executers: a class classifier 1131, a bounding box regressor 1132, and a mask predictor 1133.

The class classifier 1131 outputs a class label 1141 for an instance. The class label 1141 indicates which class each instance of the input image corresponds to. For example, the class labels may be a person, a basketball, a basketball goal stand, or the like.

The bounding box regressor 1132 outputs a bounding box offset 1142 that is generated by converting ROI Aligned features into short output vectors by a fully connected layer. The bounding box regressor 1132 may calculate four numbers (x, y, w, and h) representing a bounding box. The position of each instance may be specified by the four numbers (x, y, w, and h) representing the box.

The mask predictor 1133 predicts an m×m mask 1143 from each ROI by using a fully convolutional network (FCN). This allows each layer in a mask branch to maintain an explicit m×m object spatial layout without collapsing it into a vector representation that lacks spatial dimensions. A region of each instance may be predicted in pixels by using such a mask.

The class 1141, the bounding box offset 1142, and the mask 1143 may constitute an instance map 620.

Figure 12:
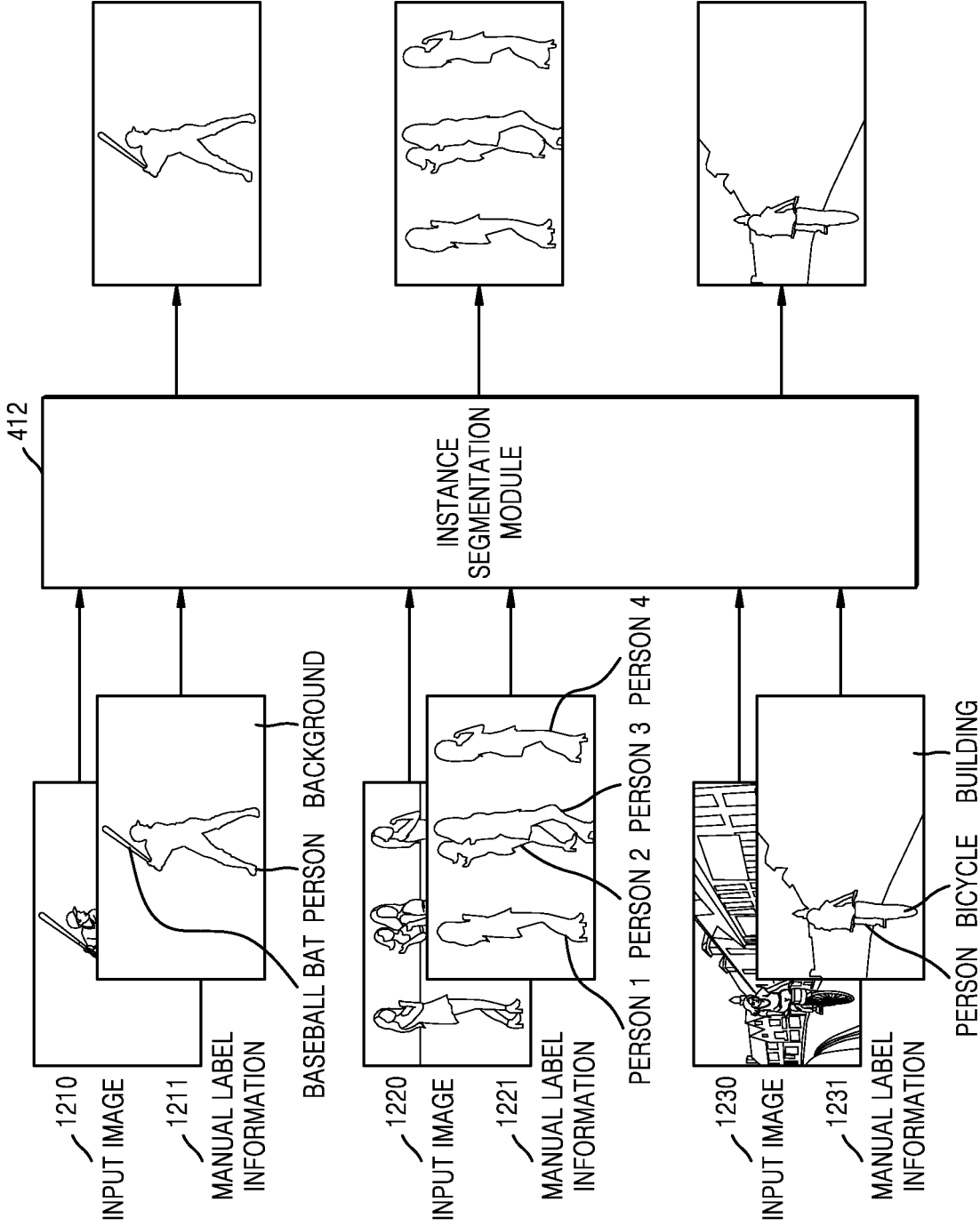
FIG. 12 is a reference diagram for describing a method of training an instance segmentation module, according to an embodiment.

FIG. 12 is a reference diagram for describing a method of training the instance segmentation module, according to an embodiment.

In order to train the instance segmentation module, a large number of input images are input, and at this time, manual label information, which is information indicating instances included in each input image, that are manually specified by a human, is also required to be input. For example, in FIG. 12, three input images are illustrated.

Referring to FIG. 12, an input image 1210 and manual label information 1211 that is label information that specifies regions, i.e., a baseball bat region and a person region, that indicate instances in the input image 1210, are input to the instance segmentation module 412. Initially, weights of a network of the instance segmentation module 412 are set as initial default values, and the instance segmentation module 412 may output a result of recognizing instances in the input image 1210 by using the weights, and compare the recognition result with the manual label information 1211 to refine the weights of the network such that a difference value therebetween is reduced.

Then, similarly, an input image 1220 and manual label information 1221 that specifies regions, i.e., person 1, person 2, person 3, and person 4, that indicate instances in the input image 1220, are input to the instance segmentation module 412. The weights of the instance segmentation module 412 are set to those refined once by the input image 1210, and the instance segmentation module 412 may output a result of recognizing instances in the input image 1220 by using the weights, and compare the recognition result with manual label information 1221 to refine the weights of the network such that a difference value therebetween is reduced.

Then, similarly, an input image 1230 and manual label information 1231 that is label information that specifies regions, i.e., a person, a bicycle, or a building, that indicate instances in the input image 1230, are input to the instance segmentation module 412. The weights of the instance segmentation module 412 are set to those refined twice by the input image 1210 and the input image 1220, and the instance segmentation module 412 may output a result of recognizing instances in the input image 1230 by using the weights, and compare the recognition result with the manual label information 1231 to refine the weights of the network such that a difference value therebetween is reduced.

Although only three input images are illustrated in FIG. 12, after a weight refining operation is performed by using, for example, 10000 or more input images, the instance segmentation module 412 may obtain weights that allow an instance recognition result for a final input image to hardly differs from manual label information for the final input image. After such weights are obtained, it may be determined that the instance segmentation module 412 has been completely trained as a network that recognizes instances in an input image and outputs an instance map.

Accordingly, after the training of the instance segmentation module 412 is completed as described above, as illustrated in FIG. 10, in response to reception of the input image, the instance segmentation module 412 may output the instance map 620 in which instances of the sky, the basketball, the basketball goal stand, the person, and the playground are masked.

Figure 13:
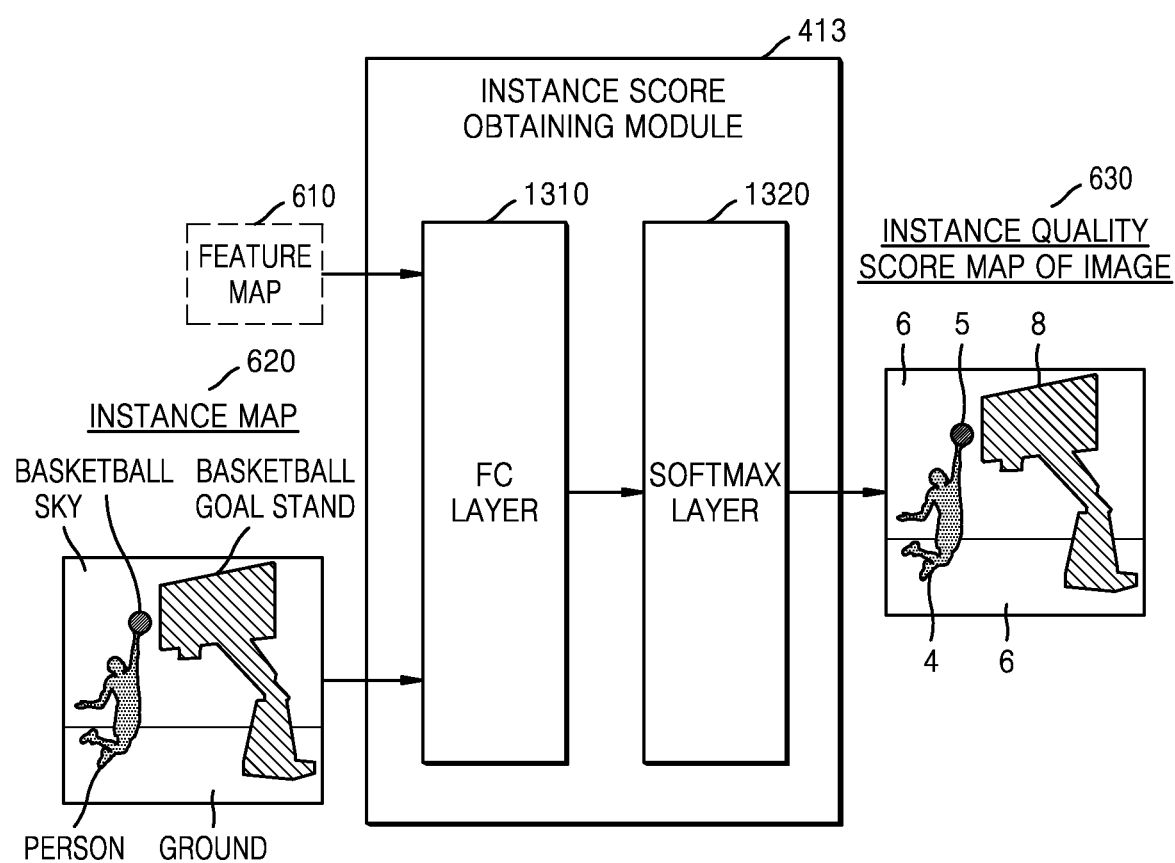
FIG. 13 illustrates an example of an instance quality score obtaining module 413 according to an embodiment.

FIG. 13 illustrates an example of the instance score obtaining module 413 according to an embodiment.

Referring to FIG. 13, the instance score obtaining module 413 may receive a feature map 610 output from the feature extraction module 411 and the instance map 620 output from the instance segmentation module 412, predict a quality score corresponding to each instance included in the instance map 620, and output an instance quality score map 630 including the predicted quality score corresponding to each instance.

The instance score obtaining module 413 may include an FC layer 1310 and a softmax layer 1320.

The instance score obtaining module 413 receives features extracted from a space of an instance level and outputs an image quality score through the fully convolutional (FC) layer 1310 and the softmax layer 1320. Assuming that the number of output dimensions of the FC layer 1310 is 10, an output passed through the FC layer 1310 and the softmax layer 1320 is a 10×1 probability array for a score range of 1 to 10. For example, in the case where an output for an instance is {0, 0, 0, 0, 0, 0, 0, 0, 0.1, 0.9}, the quality of the instance may be inferred to be 10 that is an index having the highest probability. Referring to FIG. 13, because the instance map 620 includes five instances of the person, the basketball, the basketball goal stand, the sky, and the ground, the instance score obtaining module 413 may output a quality score corresponding to each instance included in the instance map 620. For example, FIG. 13 illustrates the instance quality score map 630 having a quality score of 4 for the person instance, a quality score of 5 for the basketball instance, a quality score of 8 for the basketball goal stand instance, a quality score of 6 for the sky instance, and a quality score of 6 for the ground instance.

Figure 14:
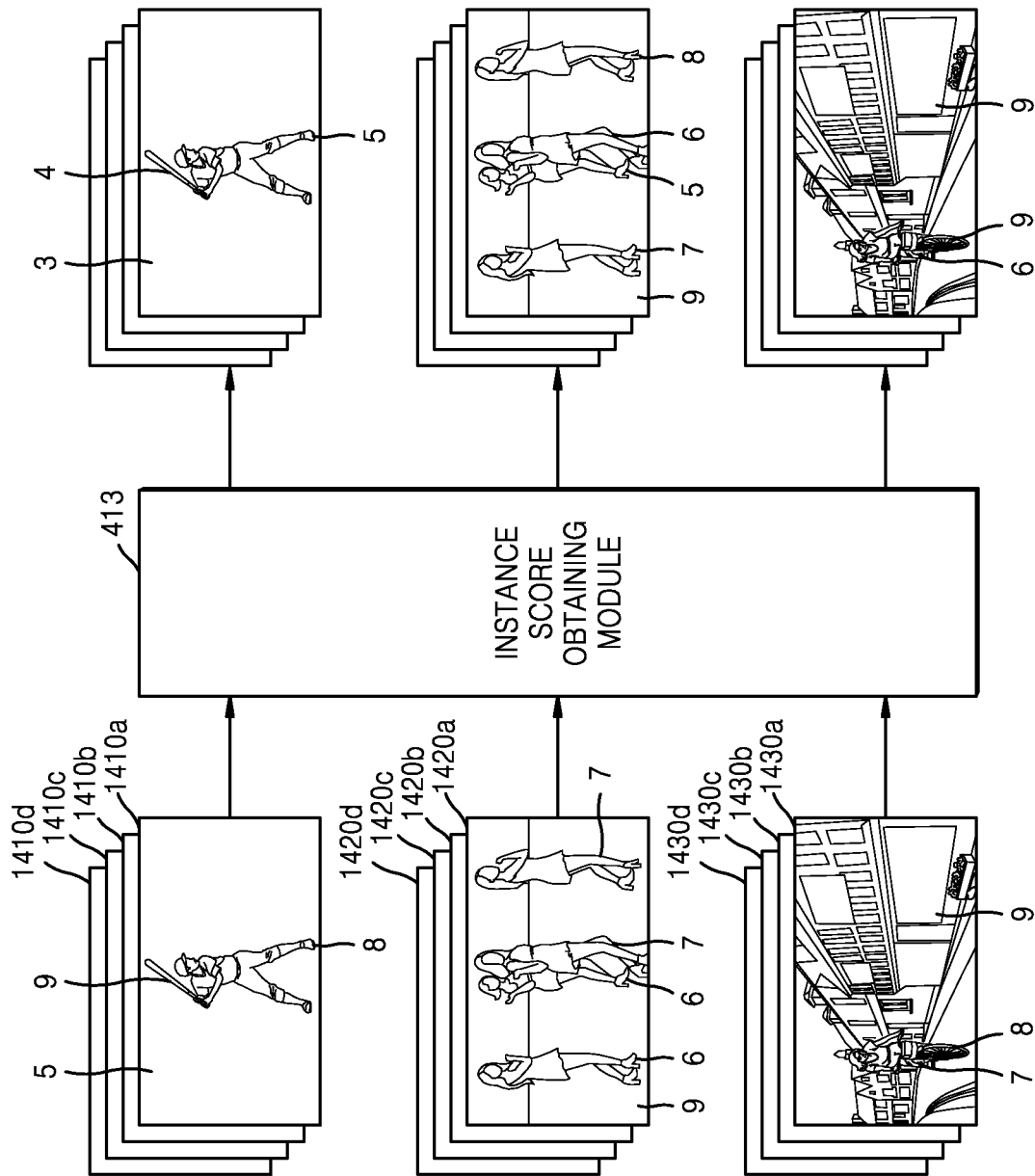
FIG. 14 illustrates an example of a method of training the instance quality score obtaining module 413, according to an embodiment.

FIG. 14 illustrates an example of a method of training the instance score obtaining module 413, according to an embodiment.

Referring to FIG. 14, in order to train the instance score obtaining module 413, a large number of input images are input, and here, a plurality of input images are generated by degrading the quality of the input images in various ways, to be used for the training. For example, if 10000 images are used as training images, and 10 images obtained by degrading the quality of each image by 10 levels are used, a total of 10000×10 images are used for the training. The quality of each input image may be degraded to various levels according to various quality factors such as detail, noise, color, or contrast. Also, manual label information which is information that is obtained by manually specifying quality scores for instances included in an input image by a human, is also required to be input. For example, in FIG. 14, three input images are illustrated.

Referring to FIG. 14, an input image 1410a and input images 1410b, 1410c, and 1410d obtained by degrading the quality of the input image 1410a are prepared. Then, quality scores determined by a human by observing a person instance, a baseball bat instance, and a background instance that are instances included in the input image 1410a, are input. FIG. 14 illustrates that the quality scores of 8 for the person instance, 9 for the baseball bat instance, and 5 for the background instance are assigned with respect to the input image 1410a. Similarly, a human may observe the input images 1410b, 1410c, and 1410d to determine quality scores.

As described above, after the input image 1410a and the quality scores determined by the human by observing the input image 1410a are input to the instance quality score obtaining module 413, initially, weights of a network of the instance quality score obtaining module 413 are set as initial default values, and the instance quality score obtaining module 413 may output a result of predicting quality scores for instances in the input image 1410a by using the weights, and compare the prediction result with the quality scores set by a user to refine the weights of the network such that a difference value therebetween is reduced. For example, referring to FIG. 14, it may be confirmed that an instance quality score prediction result of the input image 1410a by the instance score obtaining module 413 indicates 5 for the person, 4 for the baseball bat, 3 for the background, and there are a lot of differences from the quality scores set by the human which indicate 8 for the person, 9 for the baseball bat, and 5 for the background. The instance score obtaining module 413 may refine the weights of the network such that the differences between the result predicted by the module 413 and the quality scores set by the human are reduced.

Similarly, after the second input image 1410b and quality scores determined by the human by observing the input image 1410b are input to the instance score obtaining module 413, the instance score obtaining module 413 may output a result of predicting quality scores for instances in the input image 1410b by using the weights that are once refined, and compare the prediction result with the quality scores set by the user to refine the weights of the network such that a difference value therebetween is reduced.

In this manner, the instance score obtaining module 413 may refine the weights of the network such that differences between quality scores set by the human and results predicted by the module 413 with respect to input images 1410c and 1410d, input images 1420a, 1420b, 1420c, and 1420d, and input images 1430a, 1430b, 1430c, 1430d.

Although only 12 input images are illustrated in FIG. 14, after a weight refining operation is performed by using, for example, 10000 or more input images, the instance score obtaining module 413 may obtain weights that allow an instance quality score prediction result for a final input image to hardly differs from manually set quality scores for the final input image. After such weights are obtained, it may be determined that the instance score obtaining module 413 has been completely trained as a network that predicts a quality score corresponding to each instance in an input image and outputs an instance quality score map.

Accordingly, after the training of the instance score obtaining module 413 is completed as described above, as illustrated in FIG. 13, in response to reception of the feature map 610 corresponding to the input image and the instance map 620 corresponding to the input image, the instance score obtaining module 413 may obtain the instance quality score map 630 in which the quality scores for the instances of the sky, the basketball, the basketball goal stand, the person, and the playground are predicted to be 6, 5, 8, 4, and 6, respectively.

Figure 15:
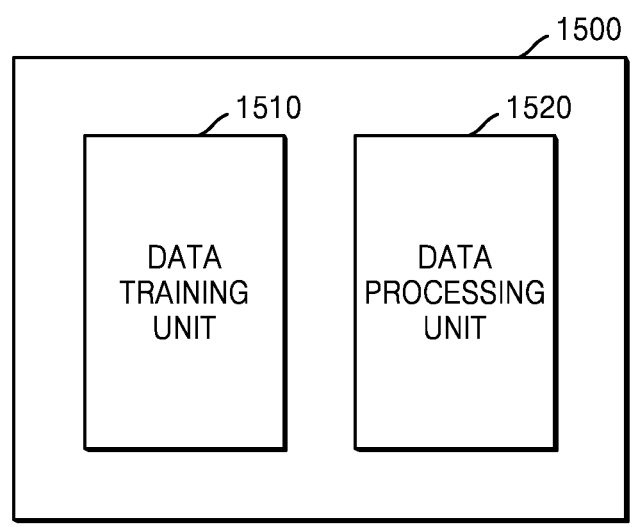
FIG. 15 is a block diagram for describing a configuration of a processor according to an embodiment in terms of training and processing of a neural network.

FIG. 15 is a block diagram for describing a configuration of the processor according to an embodiment in terms of training and processing of a neural network.

Referring to FIG. 15, a processor 1500 according to an embodiment may include a data training unit 1510 and a data processing unit 1520.

In order to train the first neural network according to an embodiment, the data training unit 1510 may train the first neural network to learn criteria for extracting features from an input image.

In addition, in order to train the second neural network according to an embodiment, the data training unit 1510 may train the second neural network to learn criteria for recognizing one or more instances included in an image by using features of the image.

In addition, in order to train the third neural network according to an embodiment, the data training unit 1510 may train the third neural network to learn criteria for predicting quality scores of the instances included in the image by using the features and an instance map of the input image.

Data processing models (e.g., the first through third neural networks) may be constructed considering an application field of a recognition model, a purpose of training, a computer performance of the device, or the like. The data processing models may be, for example, models based on neural networks. For example, a model such as a deep neural network (DNN), a recurrent neural network (RN), or a bidirectional recurrent deep neural network (BRDNN) may be used as the data processing model, but the present disclosure is not limited thereto.

In addition, the data training unit 1510 may train the data processing models by using a learning algorithm including, for example, error back-propagation or gradient descent.

Also, the data training unit 1510 may train the data processing model through, for example, supervised learning using training data as input values. Also, the data training unit 1510 may train the data processing model through, for example, unsupervised learning to find criteria for processing data by learning types of data required to process data by itself without supervision. Also, the data training unit 1510 may train the data processing model through reinforcement learning using a feedback about whether a result according to learning is right.

In addition, after the data processing model is trained, the data training unit 1510 may store the train data processing model. In this case, the data training unit 1510 may store the trained data processing models in the memory of the computing device. Alternatively, the data training unit 1510 may store the trained data processing model in a memory of a server connected to the computing device through a wired or wireless network.

The data processing unit 1520 may input an image to the data processing model including the trained first neural network, and the data processing model may output a feature map from the image as a result value. The output result value may be used to refine the data processing model including the first neural network.

The data processing unit 1520 may input the feature map of the image to the data processing model including the trained second neural network, and the data processing model may output an instance map indicating instances recognized in the image as a result value. The output result value may be used to refine the data processing model including the second neural network.

The data processing unit 1520 may input the feature map and the instance map of the image to the data processing model including the trained third neural network, and the data processing model may output an image instance quality score map including a quality score corresponding to each instance of the image as a result value. The output result value may be used to refine the data processing model including the third neural network.

At least one of the data training unit 1510 and the data processing unit 1520 may be manufactured as at least one hardware chip and may be mounted on the computing device. For example, at least one of the data training unit 1510 and the data processing unit 1520 may be manufactured in the form of a dedicated hardware chip for artificial intelligence (AI), or may be manufactured as a part of an existing general-purpose processor (e.g., a CPU or application processor) or a dedicated graphics processor (e.g., a GPU) and mounted on the computing device.

Further, the data training unit 1510 and the data processing unit 1520 may be connected to each other in a wired or wireless manner, information about a model constructed by the data training unit 1510 may be provided to the data processing unit 1520, and data input to the data processing unit 1520 may be provided to the data training unit 1510 as additional training data.

At least one of the data training unit 1510 and the data processing unit 1520 may be implemented as a software module. In the case where at least one of the data training unit 1510 and the data processing unit 1520 is implemented as a software module (or a program module including instructions), the software module may be stored in a non-transitory computer-readable medium. Also, in this case, the at least one software module may be provided by an operating system (OS) or a predefined application. Alternatively, a part of the at least one software module may be provided by an operating system (OS), and the remaining part may be provided by a predefined application.

The data training unit 1510 and the data processing unit 1520 may be mounted on a single computing device, or may be mounted on separate computing devices, respectively. For example, one of the data training unit 1510 and the data processing unit 1520 may be included in the computing device, and the other may be included in a server.

According to an example, the data training unit 1510 and the data processing unit 1520 may be installed in a user computing device, and thus, both training and data processing may be performed by the user computing device.

According to an example, after the data training unit 1510 is mounted on the server and trained, the data processing unit 1520 including a completely trained model may be mounted on the user computing device.

Figure 16:
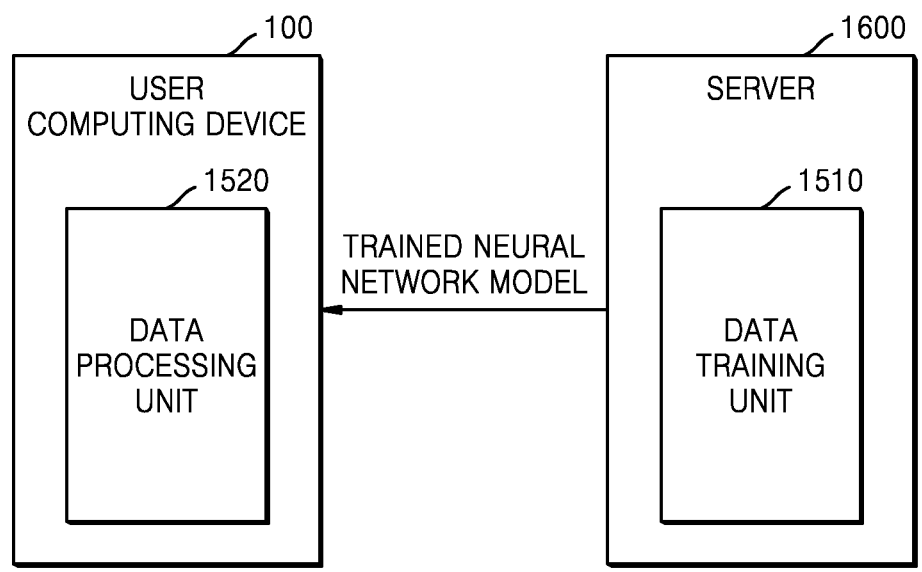
FIG. 16 illustrates an example in which a data training unit is mounted on a server and a data processing unit is mounted on a user computing device, according to an embodiment.

FIG. 16 illustrates an example in which the data training unit is mounted on a server and the data processing unit is mounted on a user computing device, according to an embodiment.

Referring to FIG. 16, a server 1600 may include a neural network model that obtains an image instance quality score map by predicting a quality score corresponding to each instance recognized from an image by using the data training unit 1510 according to the method disclosed in the present disclosure. In addition, the server 1600 may provide the neural network model trained as described above to a user computing device 100. The user computing device 100 may implement the data processing unit 1520 by using the trained neural network model received from the server 1600. In order to obtain a quality score for each instance of an input image, the user computing device may obtain the quality score for each instance of the image by using the data processing unit 1520 mounted therein without communicating with the server, perform image quality processing for each instance of the image, and output an image quality-processed image to a display of the user computing device.

Figure 17:
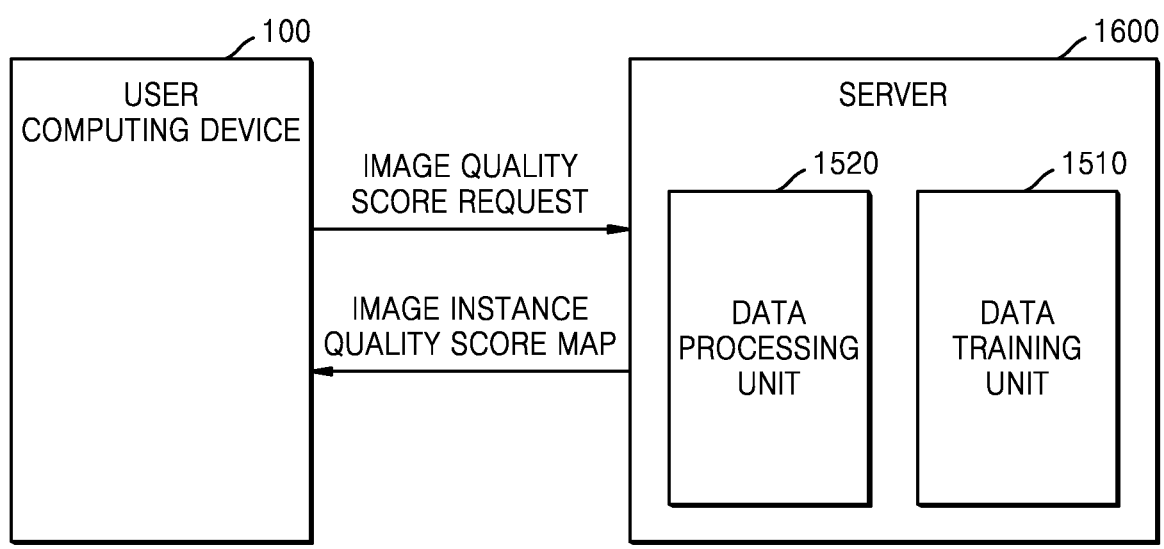
FIG. 17 illustrates an example in which both a data training unit and a data processing unit are mounted on a server, according to an embodiment.

FIG. 17 illustrates an example in which both the data training unit and the data processing unit are mounted on the server, according to an embodiment.

Referring to FIG. 17, both the data training unit 1510 and the data processing unit 1520 are mounted on the server. Accordingly, the server may obtain a neural network model for obtaining a quality score for each image instance, by training the model to learn a method of predicting a quality score corresponding to each instance recognized from an image according to the method disclosed in the present disclosure by using the data training unit 1510, and implement the data processing unit 1520 by using the obtained neural network model.

When the user computing device 100 transmits an image and an image quality score request to the server, the server 1600 may obtain an image instance quality score map by predicting a quality score corresponding to each instance of the image by using the data processing unit 1520 mounted thereon, and transmit the obtained image instance quality score map to the user computing device 100.

The operating method of the computing device according to an embodiment may be embodied as program commands executable by various computer means, and may be recorded on a computer-readable medium. The computer-readable medium may include program commands, data files, data structures, or the like separately or in combinations. The program commands to be recorded on the medium may be specially designed and configured for the present disclosure or may be well-known to and be usable by one of ordinary skill in the art of computer software. Examples of the computer-readable recording medium include magnetic media such as hard disks, floppy disks, or magnetic tapes, optical media such as CD-ROMs or DVDs, magneto-optical media such as floptical disks, and hardware devices such as ROMs, RAMs, flash memories, or the like that are specially configured to store and execute program commands. Examples of the program commands include not only machine code, such as code made by a compiler, but also high-level language code that is executable by a computer by using an interpreter or the like.

Although embodiments have been described above in detail, the scope of the present disclosure is not limited thereto, and various modifications and alterations by one of ordinary skill in the art using the basic concept of the present disclosure defined in the following claims also fall within the scope of the present disclosure.

What is claimed is:

1. A computing device comprising:
   a memory storing at least one instruction; and
   a processor configured to execute the at least one instruction stored in the memory, to:
   extract features of an input image by using a first neural network,
   recognize a plurality of instances in the input image from the features of the input image by using a second neural network,
   obtain an image instance quality score map by predicting a quality score corresponding to each instance of the plurality of instances in the input image based on the features of the input image by using a third neural network, wherein the quality score corresponding to each instance varies depending on whether the instance is in motion or not in motion, perform image quality processing differently for each instance of the plurality of instances in the input image by using the quality score corresponding to each instance of the plurality of instances in the input image by generating image quality control parameters for each instance in the input image by using the quality score corresponding to each instance in the input image, and performing the image quality processing independently for each instance in the input image by using the image quality control parameters corresponding to the instance, wherein as a value of the quality score corresponding to each instance decreases, an intensity of the image quality processing is applied more strongly, and as a value of the quality score corresponding to each instance increases, the intensity of the image quality processing is applied more lightly, and generate an output image by merging the image quality-processed instances.

2. The computing device of claim 1, wherein the image instance quality score map includes position information and the quality score of each instance of the plurality of instances in the input image.

3. The computing device of claim 1, wherein the first neural network includes at least one convolutional layer.

4. The computing device of claim 1, wherein the processor is further configured to execute the at least one instruction to obtain an instance map including a class corresponding to each instance, position information of each instance, and a mask indicating a pixel-unit region of each instance, by recognizing the plurality of instances in the input image from the features of the input image by using the second neural network.

5. The computing device of claim 1, wherein the processor is further configured to execute the at least one instruction to:

receive a plurality of training images and a quality score set for each of the plurality of instances in each training image, infer, from each training image, a quality score corresponding to each of the plurality of instances in the training image, and obtain the third neural network by determining a weight of each of at least one layer included in the third neural network to reduce differences between the set quality scores and the inferred quality scores.

6. The computing device of claim 1, wherein the image quality control parameters include an image quality control parameter for at least one of high-frequency component extraction, noise suppression sharpness enhancement, gray scale conversion, and hue correction.

7. A method of operating a computing device, the method comprising:

extracting features of an input image by using a first neural network, recognizing a plurality of instances in the input image from the features of the input image by using a second neural network, obtaining an image instance quality score map by predicting a quality score corresponding to each instance of the plurality of instances in the input image based on the features of the input image by using a third neural network, wherein the quality score corresponding to each instance varies depending on whether the instance is in motion or not in motion, performing image quality processing differently for each instance of the plurality of instances in the input image by using the quality score corresponding to each instance of the plurality of instances in the input image by generating image quality control parameters for each instance in the input image by using the quality score corresponding to each instance in the input image, and performing the image quality processing independently for each instance in the input image by using the image quality control parameters corresponding to the instance, wherein as a value of the quality score corresponding to each instance decreases, an intensity of the image quality processing is applied more strongly, and as a value of the quality score corresponding to each instance increases, the intensity of the image quality processing is applied more lightly, and generating an output image by merging the image quality-processed instances.

8. The method of claim 7, wherein the image instance quality score map includes position information and the quality score of each instance of the plurality of instances in the input image.

9. The method of claim 7, wherein the first neural network includes at least one convolutional layer.

10. The method of claim 7, further comprising obtaining an instance map including a class corresponding to each instance, position information of each instance, and a mask indicating a pixel-unit region of each instance, by recognizing the plurality of instances in the input image from the features of the input image by using the second neural network.

11. The method of claim 7, further comprising:

receiving a plurality of training images and a quality score set for each instance of the plurality of instances in each training image, inferring, from each training image, a quality score corresponding to each instance of the plurality of instances in the training image, and obtaining the third neural network by determining weights of at least one layer included in the third neural network to reduce differences between the set quality scores and the inferred quality scores.

12. The method of claim 7, wherein the image quality control parameters include an image quality control parameter for at least one of high-frequency component extraction, noise suppression sharpness enhancement, gray scale conversion, and hue correction.

13. A computer-readable recording medium having recorded thereon a program that is executed to perform an operating method of a computing device, the operating method comprising:

extracting features of an input image by using a first neural network, recognizing a plurality of instances from the features of the input image by using a second neural network, obtaining an image instance quality score map by predicting a quality score corresponding to each instance of the plurality of instances in the input image based on the features of the input image by using a third neural network, wherein the quality score corresponding to each instance varies depending on whether the instance is in motion or not in motion, performing image quality processing differently for each instance of the plurality of instances in the input image by using the quality score corresponding to each instance of the plurality of instances in the input image, by generating image quality control parameters for each instance in the input image by using the quality score corresponding to each instance in the input image, and performing the image quality processing independently for each instance in the input image by using the image quality control parameters corresponding to the instance, wherein as a value of the quality score corresponding to each instance decreases, an intensity of the image quality processing is applied more strongly, and as a value of the quality score corresponding to each instance increases, the intensity of the image quality processing is applied more lightly, and generating an output image by merging the image quality-processed instances.

* * * * *